(12) United States Patent
Mountain

(10) Patent No.: US 9,983,011 B2
(45) Date of Patent: May 29, 2018

(54) MAPPING AND FACILITATING EVACUATION ROUTES IN EMERGENCY SITUATIONS

(71) Applicant: EchoStar UK Holdings Limited, Keighley, West Yorkshire (GB)

(72) Inventor: Dale Llewelyn Mountain, Keighley (GB)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 589 days.

(21) Appl. No.: 14/528,402

(22) Filed: Oct. 30, 2014

(65) Prior Publication Data
US 2016/0123741 A1  May 5, 2016

(51) Int. Cl.
*G08B 17/00* (2006.01)
*G01C 21/20* (2006.01)
*H04N 5/44* (2011.01)
*G08B 5/36* (2006.01)
(Continued)

(52) U.S. Cl.
CPC .............. *G01C 21/206* (2013.01); *G08B 5/36* (2013.01); *G08B 7/066* (2013.01); *G08B 17/00* (2013.01); *G08B 27/008* (2013.01); *H04N 5/44* (2013.01)

(58) Field of Classification Search
CPC ........ G01C 21/206; G08B 17/00; G08B 5/36; G08B 7/066; G08B 27/008
See application file for complete search history.

(56) References Cited

U.S. PATENT DOCUMENTS

| 4,127,966 A | * | 12/1978 | Schmidt | E05B 47/0002 292/252 |
| 4,386,436 A | | 5/1983 | Kocher et al. | |
| 4,581,606 A | | 4/1986 | Mallory | |

(Continued)

FOREIGN PATENT DOCUMENTS

| CA | 2 267 988 A1 | 4/1998 |
| CN | 105814555 A | 7/2016 |

(Continued)

OTHER PUBLICATIONS

U.S. Appl. No. 14/485,188, filed Sep. 12, 2014, Pre-Interview First Office Action dated Jul. 29, 2015, 20 pages.

(Continued)

*Primary Examiner* — Thomas G Black
*Assistant Examiner* — Peter D Nolan
(74) *Attorney, Agent, or Firm* — Kilpatrick Townsend & Stockton LLP

(57) ABSTRACT

Systems and methods for indicating an emergency exit path upon detection of a fire in a building structure. The systems and methods may include detecting a signal indicating presence of the fire in the building structure and determining an evacuation situation is present based on a risk assessment. In response to determining the evacuation situation is present, the systems and methods may include mapping the emergency exit path out of the building structure based on an identified location of the fire and an identified location of a person in the building structure, and operating a plurality of lighting devices in the building structure to indicate the emergency exit path out of the building structure.

17 Claims, 7 Drawing Sheets

(51) Int. Cl.
  *G08B 7/06* (2006.01)
  *G08B 27/00* (2006.01)

(56) References Cited

U.S. PATENT DOCUMENTS

| | | | |
|---|---|---|---|
| 4,694,607 A | 9/1987 | Ishida et al. |
| 4,728,949 A | 3/1988 | Platte et al. |
| 4,959,713 A | 9/1990 | Morotomi et al. |
| 5,400,246 A | 3/1995 | Wilson et al. |
| 5,770,896 A | 6/1998 | Nakajima |
| 5,805,442 A | 9/1998 | Crater et al. |
| 5,822,012 A | 10/1998 | Jeon et al. |
| 5,886,638 A | 3/1999 | Tanguay |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,119,088 A | 9/2000 | Ciluffo |
| 6,142,913 A | 11/2000 | Ewert |
| 6,182,094 B1 | 1/2001 | Humpleman et al. |
| 6,225,938 B1 | 5/2001 | Hayes et al. |
| 6,286,764 B1 | 9/2001 | Garvey et al. |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,502,166 B1 | 12/2002 | Cassidy |
| 6,529,230 B1 | 3/2003 | Chong |
| 6,543,051 B1* | 4/2003 | Manson ............ G08B 27/008 348/461 |
| 6,553,375 B1 | 4/2003 | Huang et al. |
| 6,663,375 B1 | 8/2003 | Huang et al. |
| 6,646,676 B1 | 11/2003 | DaGraca et al. |
| 6,662,282 B2 | 12/2003 | Cochran |
| 6,744,771 B1 | 6/2004 | Barber et al. |
| 6,748,343 B2 | 6/2004 | Alexander et al. |
| 6,751,657 B1 | 6/2004 | Zothner |
| 6,756,998 B1 | 6/2004 | Bilger |
| 6,876,889 B1 | 4/2005 | Lortz et al. |
| 6,891,838 B1 | 5/2005 | Petite et al. |
| 6,931,104 B1 | 8/2005 | Foster et al. |
| 6,976,187 B2 | 12/2005 | Arnott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,088,238 B2 | 8/2006 | Karaoguz et al. |
| 7,103,545 B2 | 9/2006 | Furuta |
| 7,143,298 B2 | 11/2006 | Wells et al. |
| 7,216,002 B1 | 5/2007 | Anderson |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,391,319 B1* | 6/2008 | Walker ................ G08B 7/06 340/286.05 |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayernick et al. |
| 7,579,945 B1* | 8/2009 | Richter ................ G08B 7/066 340/286.14 |
| 7,590,703 B2 | 9/2009 | Cashman et al. |
| 7,640,351 B2 | 12/2009 | Reckamp et al. |
| 7,659,814 B2 | 2/2010 | Chen et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Philipp |
| 7,969,318 B2 | 6/2011 | White et al. |
| 8,013,730 B2 | 9/2011 | Oh et al. |
| 8,042,048 B2 | 10/2011 | Wilson et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 4/2012 | Lucas et al. |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,350,694 B1 | 1/2013 | Trundle et al. |
| 8,413,204 B2 | 4/2013 | White et al. |
| 8,436,902 B2 | 5/2013 | Kuehnle |
| 8,498,572 B1 | 7/2013 | Schooley et al. |
| 8,516,087 B2 | 8/2013 | Wilson et al. |
| 8,539,567 B1 | 9/2013 | Logue et al. |
| 8,550,368 B2 | 10/2013 | Butler et al. |
| 8,619,136 B2 | 12/2013 | Howarter et al. |
| 8,620,841 B1 | 12/2013 | Filson et al. |
| 8,644,525 B2 | 2/2014 | Bathurst et al. |
| 8,645,327 B2 | 2/2014 | Falkenburg et al. |
| 8,667,529 B2 | 3/2014 | Taxier |
| 8,750,576 B2 | 6/2014 | Huang et al. |
| 8,780,201 B1 | 7/2014 | Scalisi et al. |
| 8,781,508 B1 | 7/2014 | Blakely |
| 8,786,698 B2 | 7/2014 | Chen et al. |
| 8,799,413 B2 | 8/2014 | Taylor et al. |
| 8,818,898 B2 | 8/2014 | Schlossberg et al. |
| 8,898,709 B2 | 11/2014 | Crabtree |
| 8,923,823 B1 | 12/2014 | Wilde |
| 8,930,700 B2 | 1/2015 | Wielopolski |
| 8,948,793 B1 | 2/2015 | Birkhold et al. |
| 8,965,170 B1 | 2/2015 | Benea et al. |
| 9,019,111 B1 | 4/2015 | Sloo et al. |
| 9,049,567 B2 | 6/2015 | Le Guen et al. |
| 9,191,804 B1 | 11/2015 | Paczkowski et al. |
| 9,246,921 B1 | 1/2016 | Vlaminck et al. |
| 9,258,593 B1 | 2/2016 | Chen et al. |
| 9,353,500 B1 | 5/2016 | Andreski |
| 9,443,142 B2 | 9/2016 | Reynolds, Jr. |
| 9,462,041 B1 | 10/2016 | Hagins et al. |
| 9,495,860 B2 | 11/2016 | Lett |
| 9,511,259 B2 | 12/2016 | Mountain |
| 9,599,981 B2 | 3/2017 | Crabtree |
| 9,621,959 B2 | 4/2017 | Mountain |
| 9,632,746 B2 | 4/2017 | Keipert et al. |
| 9,633,186 B2 | 4/2017 | Ingrassia, Jr. et al. |
| 9,729,989 B2 | 8/2017 | Marten |
| 9,769,522 B2 | 9/2017 | Richardson |
| 2001/0012998 A1 | 8/2001 | Jouet et al. |
| 2002/0003493 A1 | 1/2002 | Durst et al. |
| 2002/0019725 A1 | 2/2002 | Petite |
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0201900 A1 | 10/2003 | Bachinski et al. |
| 2004/0019489 A1 | 1/2004 | Funk et al. |
| 2004/0036579 A1* | 2/2004 | Megerle ............... G08B 7/066 340/332 |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |

(56) References Cited

U.S. PATENT DOCUMENTS

| | | |
|---|---|---|
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1* | 8/2007 | Nathan ............... G08B 7/066 340/572.1 |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1* | 5/2008 | Walter ............... G08B 27/005 725/33 |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1* | 1/2009 | Farley ............... G08B 7/06 340/6.11 |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1* | 10/2009 | Hamada ............... G01C 21/20 455/404.1 |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1* | 7/2010 | Wedig ............... G08B 7/066 340/577 |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1* | 12/2010 | Grundler ............... A62B 3/00 340/588 |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates |
| 2012/0047083 A1* | 2/2012 | Qiao ............... A62C 99/009 705/325 |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0167646 A1 | 7/2012 | Sharma et al. |
| 2012/0226366 A1 | 9/2012 | Lee et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |

(56) References Cited

U.S. PATENT DOCUMENTS

| | | | |
|---|---|---|---|
| 2013/0120137 A1* | 5/2013 | Lehmann | G08B 21/02 340/524 |
| 2013/0124192 A1 | 5/2013 | Lindmark et al. | |
| 2013/0138757 A1 | 5/2013 | Ferron | |
| 2013/0147604 A1* | 6/2013 | Jones, Jr. | G08B 7/066 340/6.1 |
| 2013/0152139 A1 | 6/2013 | Davis et al. | |
| 2013/0158717 A1 | 6/2013 | Zywicki et al. | |
| 2013/0179926 A1 | 7/2013 | White et al. | |
| 2013/0185750 A1 | 7/2013 | Ayoub | |
| 2013/0204408 A1 | 8/2013 | Thiruvengada et al. | |
| 2013/0219482 A1 | 8/2013 | Brandt | |
| 2013/0238326 A1 | 9/2013 | Kim et al. | |
| 2013/0242074 A1* | 9/2013 | Sekiguchi | G08B 7/066 348/77 |
| 2013/0247117 A1 | 9/2013 | Yamada et al. | |
| 2013/0267383 A1 | 10/2013 | Watterson | |
| 2013/0278828 A1 | 10/2013 | Todd | |
| 2013/0289788 A1 | 10/2013 | Gupta et al. | |
| 2013/0300576 A1 | 11/2013 | Sinsuan et al. | |
| 2013/0318559 A1 | 11/2013 | Crabtree | |
| 2013/0321637 A1 | 12/2013 | Frank et al. | |
| 2013/0324247 A1 | 12/2013 | Esaki et al. | |
| 2014/0025798 A1 | 1/2014 | Apte et al. | |
| 2014/0028546 A1 | 1/2014 | Jeon et al. | |
| 2014/0070959 A1 | 3/2014 | Bhargava et al. | |
| 2014/0089671 A1 | 3/2014 | Logue et al. | |
| 2014/0095684 A1 | 4/2014 | Nonaka et al. | |
| 2014/0101465 A1 | 4/2014 | Wang et al. | |
| 2014/0135993 A1 | 5/2014 | Kang et al. | |
| 2014/0142724 A1 | 5/2014 | Park et al. | |
| 2014/0160360 A1 | 6/2014 | Hsu et al. | |
| 2014/0167969 A1* | 6/2014 | Wedig | G08B 7/066 340/584 |
| 2014/0168277 A1 | 6/2014 | Ashley et al. | |
| 2014/0192197 A1 | 7/2014 | Hanko et al. | |
| 2014/0192997 A1 | 7/2014 | Niu et al. | |
| 2014/0201315 A1 | 7/2014 | Jacob et al. | |
| 2014/0215505 A1 | 7/2014 | Balasubramanian et al. | |
| 2014/0217905 A1 | 8/2014 | Clayton et al. | |
| 2014/0218517 A1 | 8/2014 | Kim et al. | |
| 2014/0222634 A1 | 8/2014 | Gordon et al. | |
| 2014/0223548 A1 | 8/2014 | Wassingbo | |
| 2014/0266669 A1 | 9/2014 | Fadell et al. | |
| 2014/0266684 A1 | 9/2014 | Poder et al. | |
| 2014/0282653 A1 | 9/2014 | Ariantaj et al. | |
| 2014/0310075 A1 | 10/2014 | Ricci | |
| 2014/0313014 A1* | 10/2014 | Huh | G08B 7/066 340/7.55 |
| 2014/0333529 A1 | 11/2014 | Kim et al. | |
| 2014/0351832 A1 | 11/2014 | Cho et al. | |
| 2014/0362201 A1 | 12/2014 | Nguyen et al. | |
| 2014/0373074 A1* | 12/2014 | Hwang | H04N 21/42201 725/56 |
| 2015/0008846 A1 | 1/2015 | Chen et al. | |
| 2015/0015401 A1* | 1/2015 | Wedig | G08B 17/10 340/577 |
| 2015/0029096 A1 | 1/2015 | Ishihara | |
| 2015/0054910 A1 | 2/2015 | Offen et al. | |
| 2015/0061859 A1 | 3/2015 | Matsuoka et al. | |
| 2015/0066173 A1 | 3/2015 | Ellis et al. | |
| 2015/0074259 A1 | 3/2015 | Ansari et al. | |
| 2015/0082225 A1 | 3/2015 | Shearer | |
| 2015/0084770 A1 | 3/2015 | Xiao et al. | |
| 2015/0085184 A1 | 3/2015 | Vidal et al. | |
| 2015/0097689 A1 | 4/2015 | Logue et al. | |
| 2015/0100167 A1 | 4/2015 | Sloo et al. | |
| 2015/0106866 A1 | 4/2015 | Fujita | |
| 2015/0113571 A1 | 4/2015 | Cholas et al. | |
| 2015/0116113 A1 | 4/2015 | Caine et al. | |
| 2015/0127712 A1 | 5/2015 | Fadell et al. | |
| 2015/0131500 A1 | 5/2015 | Xie et al. | |
| 2015/0137967 A1* | 5/2015 | Wedig | G08B 25/016 340/501 |
| 2015/0142991 A1 | 5/2015 | Zaloom | |
| 2015/0143406 A1 | 5/2015 | Cho et al. | |
| 2015/0143408 A1 | 5/2015 | Sallas | |
| 2015/0145643 A1 | 5/2015 | Fadell et al. | |
| 2015/0154850 A1 | 6/2015 | Fadell et al. | |
| 2015/0156030 A1 | 6/2015 | Fadell et al. | |
| 2015/0156612 A1 | 6/2015 | Vemulapalli | |
| 2015/0159401 A1 | 6/2015 | Patrick et al. | |
| 2015/0160623 A1 | 6/2015 | Holley | |
| 2015/0160634 A1 | 6/2015 | Smith et al. | |
| 2015/0160635 A1 | 6/2015 | Schofield et al. | |
| 2015/0160636 A1 | 6/2015 | McCarthy et al. | |
| 2015/0160663 A1 | 6/2015 | McCarthy et al. | |
| 2015/0160935 A1 | 6/2015 | Nye | |
| 2015/0161452 A1 | 6/2015 | McCarthy et al. | |
| 2015/0161882 A1 | 6/2015 | Lett | |
| 2015/0162006 A1 | 6/2015 | Kummer | |
| 2015/0163411 A1 | 6/2015 | McCarthy, III et al. | |
| 2015/0163412 A1 | 6/2015 | Holley et al. | |
| 2015/0163535 A1 | 6/2015 | McCarthy et al. | |
| 2015/0172742 A1 | 6/2015 | Richardson | |
| 2015/0180708 A1 | 6/2015 | Jacob et al. | |
| 2015/0192914 A1 | 7/2015 | Slupik | |
| 2015/0198941 A1 | 7/2015 | Pederson | |
| 2015/0241860 A1 | 8/2015 | Raid | |
| 2015/0260424 A1 | 9/2015 | Fadell et al. | |
| 2015/0281824 A1 | 10/2015 | Nguyen et al. | |
| 2015/0309487 A1 | 10/2015 | Lyman | |
| 2015/0325096 A1 | 11/2015 | Hatch | |
| 2015/0334069 A1 | 11/2015 | Winston et al. | |
| 2015/0341599 A1 | 11/2015 | Carey | |
| 2015/0347910 A1 | 12/2015 | Fadell et al. | |
| 2015/0365787 A1 | 12/2015 | Farrell | |
| 2016/0029153 A1 | 1/2016 | Linn et al. | |
| 2016/0047569 A1 | 2/2016 | Fadell et al. | |
| 2016/0063854 A1 | 3/2016 | Burton et al. | |
| 2016/0066046 A1 | 3/2016 | Mountain | |
| 2016/0091471 A1 | 3/2016 | Benn | |
| 2016/0098309 A1 | 4/2016 | Kim | |
| 2016/0100696 A1 | 4/2016 | Palashewski et al. | |
| 2016/0109864 A1 | 4/2016 | Lonn | |
| 2016/0121161 A1 | 5/2016 | Mountain | |
| 2016/0163168 A1 | 6/2016 | Brav et al. | |
| 2016/0182249 A1 | 6/2016 | Lea | |
| 2016/0191912 A1 | 6/2016 | Lea et al. | |
| 2016/0191990 A1 | 6/2016 | McCarthy | |
| 2016/0196731 A1 | 7/2016 | Aich et al. | |
| 2016/0203700 A1 | 7/2016 | Bruhn et al. | |
| 2016/0234034 A1 | 8/2016 | Mahar et al. | |
| 2016/0256485 A1 | 9/2016 | Wager et al. | |
| 2016/0260135 A1 | 9/2016 | Zomet et al. | |
| 2016/0285644 A1 | 9/2016 | Lu et al. | |
| 2016/0286327 A1 | 9/2016 | Marten | |
| 2016/0323548 A1 | 11/2016 | Khot et al. | |
| 2016/0334811 A1 | 11/2016 | Marten | |
| 2016/0335423 A1 | 11/2016 | Beals | |
| 2016/0338179 A1 | 11/2016 | Aliakseyeu et al. | |
| 2016/0342379 A1 | 11/2016 | Keipert et al. | |
| 2016/0366746 A1 | 12/2016 | van de Ven et al. | |
| 2017/0005822 A1 | 1/2017 | Gao | |
| 2017/0041886 A1 | 2/2017 | Baker et al. | |
| 2017/0048476 A1 | 2/2017 | Freiin von Kapri et al. | |
| 2017/0051925 A1 | 2/2017 | Stefanski et al. | |
| 2017/0054615 A1 | 2/2017 | Wilson | |
| 2017/0065433 A1 | 3/2017 | Singh et al. | |
| 2017/0082987 A1 | 3/2017 | Reddy et al. | |
| 2017/0127124 A9 | 5/2017 | Wilson et al. | |
| 2017/0146964 A1 | 5/2017 | Beals | |
| 2017/0168469 A1 | 6/2017 | Marten et al. | |
| 2017/0176961 A1 | 6/2017 | Tirpak | |
| 2017/0187993 A1 | 6/2017 | Martch et al. | |
| 2017/0191693 A1 | 7/2017 | Bruhn et al. | |
| 2017/0191695 A1 | 7/2017 | Bruhn et al. | |
| 2017/0195130 A1 | 7/2017 | Landow et al. | |

FOREIGN PATENT DOCUMENTS

| | | |
|---|---|---|
| EP | 2 736 027 A1 | 5/2014 |
| EP | 3 080 677 A1 | 10/2016 |

(56) References Cited

FOREIGN PATENT DOCUMENTS

| EP | 3 080 710 A1 | 10/2016 |
|---|---|---|
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2014/068556 A1 | 5/2014 |
| WO | 2015/179120 A1 | 11/2015 |
| WO | 2016/034880 A1 | 3/2016 |
| WO | 2016/066399 A1 | 5/2016 |
| WO | 2016/066442 A1 | 5/2016 |
| WO | 2016/182696 A1 | 11/2016 |
| WO | 2017/116533 A1 | 7/2017 |

OTHER PUBLICATIONS

U.S. Appl. No. 14/485,188, filed Sep. 12, 2014, Pre-Interview First Office Action dated Oct. 1, 2015, 10 pages.
International Preliminary Report on Patentability for PCT/EP2011/051608 dated Aug. 16, 2012, 8 pages.
International Search Report and Written Opinion for PCT/US2014/053876 dated Nov. 26, 2014, 8 pages.
International Search Report and Written Opinion for PCT/US2014/055441 dated Dec. 4, 2014, 10 pages.
International Search Report and Written Opinion for PCT/US2014/055476 dated Dec. 30, 2014, 10 pages.
"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
"Do you want to know how to find water leaks? Use a Bravedo Water Alert Flow Monitor to find out!", Bravedo.com, accessed Dec. 16, 2014, 10 pages. Retrieved from http://bravedo.com/.
"Flow Pulse®, Non-invasive clamp-on flow monitor for pipes," Pulsar Process Measurement Ltd, accessed on Dec. 16, 2014, 2 pages. Retrieved from http://www.pulsar-pm.com/product-types/flow/flow-pulse.aspx.
"Introduction to Ultrasonic Doppler Flowmeters," Omega Engineering inc., accessed on Dec. 16, 2014, 3 pages. Retrieved from http://www.omega.com/prodinfo/ultrasonicflowmeters.html.
"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
Mexican Institute of Industrial Property Office Action dated Nov. 1, 2013, for Mex. Patent Appln No. MX/a/2012/008882, 3 pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.
U.S. Appl. No. 14/528,739, filed Oct. 30, 2014 Notice of Allowance dated Jun. 23, 2016, 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015, Non-Final Rejection dated May 20, 2016, 42 pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
International Preliminary Report on Patentability for PCT/US2014/055476 dated Jun. 14, 2016, 9 pages.
Mexican Institute of Industrial Property Notice of Allowance dated Feb. 10, 2014, for Mex. Patent Appln No. MX/a/2012/008882, 1 page.
U.S. Appl. No. 12/700,310, filed Feb. 4, 2010 Non-Final Office Action dated Mar. 11, 2015, 35 pages.

U.S. Appl. No. 14/107,132, filed Dec. 16, 2013 Non Final Office Action dated May 27, 2015, 26 pages.
Author Unknown, "AllJoyn Onboarding Service Frameworks," Qualcomm Connected Experiences, Inc., accessed on Jul. 15, 2014, 9 pages. Retrieved from https://www.alljoyn.org.
Author Unknown, "App for Samsung Smart TV®," Crestron Electronics, Inc., accessed on Jul. 14, 2014, 3 pages. Retrieved from http://www.crestron.com/products/smart tv television apps/.
Author Unknown, "International Building Code Excerpts, Updated with recent code changes that impact electromagnetic locks," Securitron, Assa Abloy, 2007, 2009,2 pages. Retrieved from: www.securitron.com/Other/.../New_IBC-IFC_Code_Language.pdf.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
Lamonica, M., "CES 2010 Preview: Green comes in many colors," retrieved from CNET.com (http://ces.cnet.com/8301-31045_1-10420381-269.html), Dec. 22, 2009, 2 pages.
Robbins, Gordon, Deputy Chief, "Addison Fire Department Access Control Installation," 2006 International Fire Code, Section 1008.1.3.4, 4 pages.
International Search Report and Written Opinion of PCT/EP2011/051608 dated May 30, 2011, 11 pages.
Mexican Institute of Industrial Property Office Action dated Dec. 16, 2013, for Mex. Patent Appln No. MX/a/2012/008882, 3 pages.
U.S. Appl. No. 12/700,310, filed Feb. 4, 2010 Office Action dated May 4, 2012, 15 pages.
U.S. Appl. No. 12/700,310, filed Feb. 4, 2010 Final Office Action dated Oct. 10, 2012, 16 pages.
U.S. Appl. No. 12/700,310, filed Feb. 4, 2010 Non-Final Office Action dated Apr. 1, 2013, 16 pages.
U.S. Appl. No. 12/700,310, filed Feb. 4, 2010 Non-Final Office Action dated Oct. 15, 2013, 15 pages.
U.S. Appl. No. 12/700,310, filed Feb. 4, 2010 Final Office Action dated Feb. 28, 2014, 17 pages.
U.S. Appl. No. 12/700,310, filed Feb. 4, 2010 Non-Final Office Action dated Aug. 14, 2014, 18 pages.
U.S. Appl. No. 12/700,408, filed Feb. 4, 2010 Notice of Allowance dated Jul. 28, 2012, 8 pages.
U.S. Appl. No. 13/680,934, filed Nov. 19, 2012 Non-Final Office Action dated Oct. 2, 2013, 7 pages.
U.S. Appl. No. 13/680,934, filed Nov. 19, 2012 Final Office Action dated Feb. 10, 2014, 13 pages.
U.S. Appl. No. 13/680,934, filed Nov. 19, 2012 Notice of Allowance dated Apr. 30, 2014, 9 pages.
U.S. Appl. No. 13/680,934, filed Nov. 19, 2012 Notice of Allowance dated Jul. 25, 2014, 12 pages.
U.S. Appl. No. 12/700,310, filed Feb. 4, 2010 Notice of Allowance dated Nov. 8, 2016, all pages.
U.S. Appl. No. 14/584,075, filed Dec. 29, 2014, Final Rejection dated Oct. 6, 2016, all pages.
U.S. Appl. No. 14/567,765, filed Dec. 11, 2014, First Action interview dated Oct. 18, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
International Search Report and Written Opinion for PCT/EP2015/073299 dated Jan. 4, 2016, 12 pages.
International Search Report and Written Opinion for PCT/EP2015/073936 dated Feb. 4, 2016, all pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.

(56) References Cited

OTHER PUBLICATIONS

Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-8433, Abstract and sections 3 and 4.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
U.S. Appl. No. 14/470,352, filed Aug. 27, 2014 Non Final Office Action dated Nov. 20, 2015, 28 pages.
International Search Report and Written Opinion for PCT/GB2015/052457 dated Nov. 13, 2015, 11 pages.
U.S. Appl. No. 12/700,310, filed Feb. 4, 2010 Final Office Action dated Oct. 26, 2015, 19 pages.
U.S. Appl. No. 14/107,132, filed Dec. 16, 2013, Final Rejection dated Dec. 16, 2015, 32 pages.
U.S. Appl. No. 14/470,352, filed Aug. 27, 2014 Final Office Action dated Mar. 17, 2016, all pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
U.S. Appl. No. 14/470,352, filed Aug. 27, 2014 Non Final Office Action dated Aug. 26, 2016, all pages.
U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
International Preliminary Report on Patentability for PCT/GB2015/052544 dated Mar. 7, 2017, all pages.
International Search Report and Written Opinion for PCT/US2016/057729 dated Mar. 28, 2017, all pages.
European Search Report for EP 16 20 0422 dated Jan. 13, 2017, all pages.
Bdejong_Cree, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/475,252, filed Sep. 2, 2014, Non-Final Rejection dated Apr. 12, 2017, all pages.
Notification of Publication of European Application No. 15763643.2 as EP 3189511 dated Jul. 12, 2017, 1 page.
Notification of Publication of Brazilian Application No. BR 11 2016 0112032 dated Aug. 8, 2017, 2 pages.
Notification of Publication of Brazilian Application No. BR 11 2016 010376 9 dated Aug. 8, 2017, 1 page.
Supplementary European Search Report for EP 14868928 dated Jul. 7, 2017, 11 pages.
Supplementary European Search Report for EP 14870507 dated Jun. 28, 2017, all pages.
"Plug-In Carbon Monoxide & Natural Gas Alarm with Backup Battery Protection," Universal Security Instruments, Inc. , 2011, 12 pages.
U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
U.S. Appl. No. 14/553,763, filed Nov. 25, 2014 Preinterview first office action dated Oct. 6, 2017, all pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.

* cited by examiner

MAPPING AND FACILITATING EVACUATION ROUTES IN EMERGENCY SITUATIONS

BACKGROUND

Home automation systems are becoming increasingly prevalent. Such systems may incorporate a variety of electronic devices, such as "smart" electronics that allow end-users to control and/or view status information of those devices, and non-smart electronics. Such systems may further be used to enhance home security, for instance by detecting and responding to emergency situations, such as fire, burglary, accidents, and other crisis. This disclosure is intended to enhance home automation systems and to provide related advantages.

SUMMARY

In one aspect, a method for indicating an emergency exit path upon detection of a fire in a building structure may comprise detecting, by a television receiver, a signal indicating presence of the fire in the building structure and upon detecting the signal indicating the presence of the fire, determining, by the television receiver, an evacuation situation is present based on a risk assessment. The method may comprise, in response to determining the evacuation situation is present, mapping, by the television receiver, the emergency exit path out of the building structure based on an identified location of the fire and an identified location of a person in the building structure. Further, the method may comprise operating, by the television receiver, a plurality of lighting devices in the building structure to indicate the emergency exit path out of the building structure.

Various embodiments of the present method may include one or more of the following features. The method may comprise unlocking, by the television receiver, at least one door lock of an in-path door in the building structure to indicate the emergency exit path out of the building structure, wherein the in-path door is located within the emergency exit path. The method may comprise signaling, by the television receiver, a door opening module corresponding to the in-path door in the building structure to open and maintain and open position of the in-path door. In another aspect, the method may comprise locking, by the television receiver, at least one door lock of an out-of-path door in the building structure to indicate the emergency exit path out of the building structure, wherein the out-of-path door lock is located outside of the emergency exit path. In another aspect, the method may comprise unlocking, by the television receiver, at least one window lock of a window in the building structure to indicate the emergency exit path out of the building structure.

Further, the method may comprise mapping, by the television receiver, a plurality of emergency exit paths out of the building structure based on the identified location of the fire and a plurality of identified locations of a plurality of persons, and operating, by the television receiver, the plurality of lighting devices in the building structure to indicate the plurality of emergency exit paths out of the building structure. The risk assessment may comprise steps including collecting, by the television receiver, one or more conditions of the fire in the building structure, assessing, by the television receiver, a risk level based on the one or more collected conditions, and determining, by the television receiver, the evacuation situation is present based on the assessed risk level. In another aspect, the one or more conditions may comprise at least one or more of the identified location of the fire in the building structure, the identified location of the person in the building structure, an identified size of the fire in the building structure, an identified trait of the person in the building structure, and a status of a fire protection device in the building structure.

Still further, the status may comprise at least one of a presence, absence, active, and inactive status of the fire protection device. The fire protection device may comprise at least one of a fire extinguisher and a sprinkler system. In other aspects, the fire protection device may be located at the identified location of the fire in the building structure. Each of the identified location of the fire and the identified location of the person may comprise an identified room of the building structure. In another aspect, the identified trait of the person may comprise at least one of a name, an age range, a weight, a height, a handicap status, and a responsiveness status. Still, other aspects, the identified size of the fire in the building may be based on at least one sensed input detected by at least one sensor, wherein the at least one sensors comprises an optical sensor, an infrared sensor, a heat sensor, a temperature sensor, and an odor detector.

Even further, the signal indicating presence of the fire in the building structure may be based on a sensed input at a detector comprising at least one of a smoke detector and a heat detector. Still further, operating the plurality of lighting devices may comprise at least one of: intermittently powering on and off one or more of the plurality of lighting devices, intermitting dimming on and off one or more of the plurality of lighting devices, and controlling color changes of the one or more plurality of lighting devices. In other aspects, the method may comprise, in response to detecting the signal indicating the presence of the fire, outputting, by the television receiver, an audio broadcast over one or more audio speakers in communication with the television receiver. Further, the method may comprise detecting, by the television receiver, one or more emergency responders in a proximity of the building structure, and in response to detecting the one or more emergency responders, unlocking, by the television receiver, at least one door lock of the building structure.

In another aspect, a television receiver for indicating an emergency exit path upon detection of a fire in a building structure comprises one or more processors and a memory communicatively coupled with and readable by the one or more processors and having stored therein processor-readable instructions. When executed by the one or more processors, the processor-readable instructions may cause the one or more processors to detect a signal indicating presence of the fire in the building structure, and upon detecting the signal indicating the presence of the fire, determine an evacuation situation is present based on a risk assessment. The processor-readable instructions may further comprise, in response to determining the evacuation situation is present, map the emergency exit path out of the building structure based on an identified location of the fire and an identified location of a person in the building structure, and operate a plurality of lighting devices in the building structure to indicate the emergency exit path out of the building structure.

In yet another aspect, a non-transitory computer readable medium may have stored thereon sets of instructions which, when executed by a computer, cause the computer to detect a signal indicating a presence of a fire in a building structure, and upon detecting the signal indicating the presence of the fire, determine an evacuation situation is present based on a risk assessment. The sets of instructions may further comprise, in response to determining the evacuation situation is present, map the emergency exit path out of the building structure based on an identified location of the fire and an identified location of a person in the building structure, and operate a plurality of lighting devices in the building structure to indicate the emergency exit path out of the building structure.

DETAILED DESCRIPTION

The present disclosure is directed to systems and methods for mapping and facilitating evacuation routes in emergency situations. It is contemplated that the systems and methods disclosed herein may be implemented in a residential building structure, such as a home, by incorporating one or more centralized devices such as a television receiver, a home automation system, and/or other integrated systems. Advantageously, such an implementation may enhance safety and security of the home by detecting and responding to emergency situations, such as fire, burglary, accidents, and other crisis that may arise throughout the home in any floor or room, regardless of whether the home is occupied or vacant at the time. For instance, and merely by way of example, upon detection of a fire in a room, the systems and methods discussed herein may indicate or otherwise provide an evacuation route, e.g. an emergency exit path, out of the house. The emergency exit path may be immediately mapped according to determined locations of the fire and any occupants, and immediately indicated to the occupants by utilizing ambient lighting devices, e.g. ceiling light fixtures and lamps, door and/or window locks, and intercom or other speaker systems. Further, the systems and methods disclosed herein may interface with local emergency responders, such as vehicles and computer systems associated with police responders, fire department responders, and emergency medical responders. Although not so limited, various aspects of the present disclosure may be gained from the following discussion in connection with the drawings.

Figure 1:
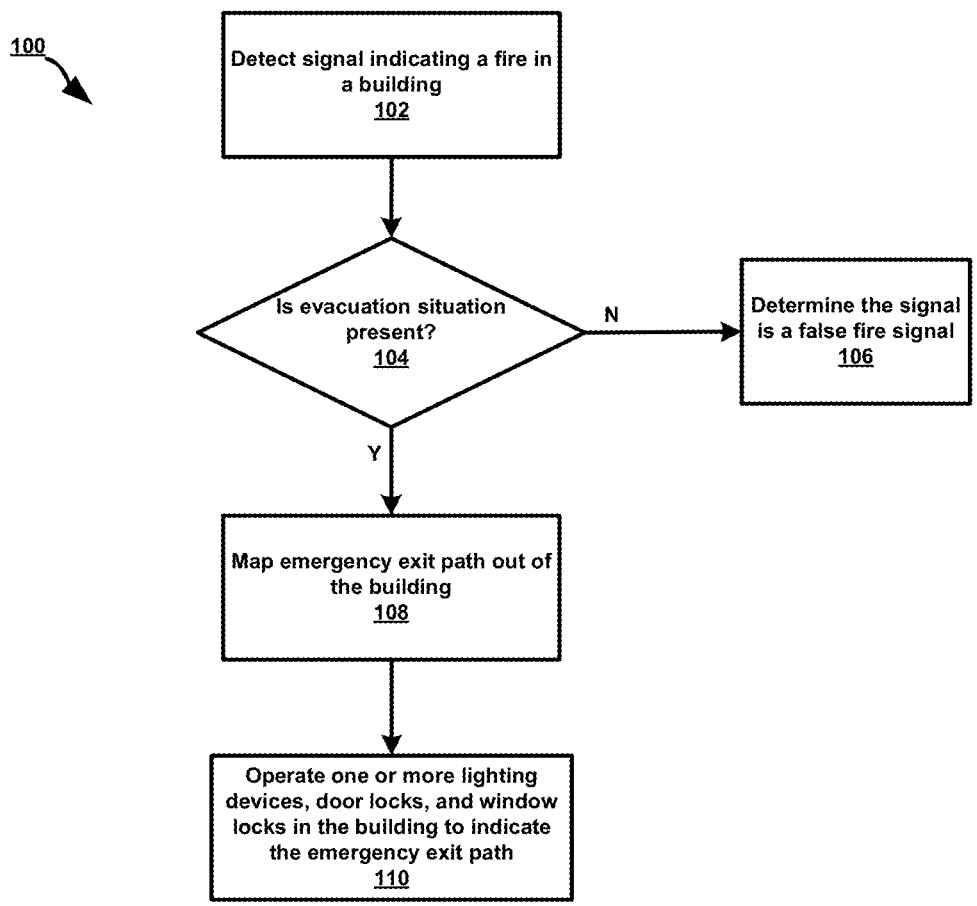
FIG. 1 shows an example method, according to various embodiments of the present disclosure.

For instance, referring to FIG. 1, an example method 100 is shown in accordance with the principles of the present disclosure. It is contemplated that aspects of the method 100 may be implemented wholly or at least partially by a satellite television receiver, consistent with the example of a satellite television implementation as discussed throughout.

At step 102, a particular television receiver that is incorporated into a home automation system as a home automation gateway device or the like may receive or otherwise detect a signal indicating a fire in a building structure, such as a home. The signal indicating the fire may comprise electrical signals or packets sent through a communication network or protocol from a sensor that detected a fire-related sensed input. In another example, the signal indicating the fire may arise from detection of a fire-related sensed input by a sensor at the television receiver. Such fire-related sensed input may include detection of threshold levels of smoke particles, carbon dioxide, carbon monoxide, and/or any other triggering elements that register at the one or more sensor(s). In one embodiment, a user may customize and program various threshold levels and various components that can trigger the signal indicating the fire. Other examples are possible.

At step 104, the particular television receiver may make a determination as to whether an evacuation situation is present at the home. For instance, the television receiver may determine whether the detected signal corresponds to a valid fire signal or to a false fire signal, such as an unwanted fire signal or false alarm. Further, the television receiver may determine if there are one or more occupants within the home and if they need to be evacuated. The determination may be based on a risk analysis that takes into account one or more conditions detected at the time of detection of the fire signal. Such conditions may include, but are not limited to, an identified location of the fire, and identified size of the fire, an identified trait of one or more persons within the home, and a status of a fire protection device in the home and/or at the location of the fire. Such conditions may initially be sensed by "live" security cameras distributed throughout the rooms in the house, motion sensors, location sensors, audio sensors, temperature sensors, infrared sensors, signals to and from various communication/mobile devices, and the like. Any sensed data may be analyzed and assessed to correspond to various levels of conditions by the television receiver. Other examples are possible.

When, for example, the determination corresponds to the false fire signal, process flow within the example method 100 may branch to step 106. At step 106, the particular television receiver may log the false signal into a database, along with various conditions that may be related to the false signal, such as the particular sensor generating the false signal, a time and date stamp, and so on. In some examples, the television receiver may notify a designated user that a false fire signal was detected. Such notifications may be sent through various internet and cellular communication networks, as well as broadcast through various speakers, televisions, and/or intercom systems. The notifications may include a message that a false fire signal was detected in a certain room of the house and/or further user instructions. In other examples, the television receiver may continue monitoring the room from which the false signal was generated and continue assessing the situation for a predetermined period of time, until sensors are no longer registering the triggering elements, and/or based on user input instructions received by the television receiver.

When, however, the determination corresponds to a valid fire signal, process flow within the example method 100 may branch to step 108. At step 108, the particular television receiver may map an emergency exit path out of the home. In some examples, mapping comprises determining one or more routes for exiting the home and/or visually providing the one or more routes to the one or more users, e.g. via television display screen and/or mobile devices associated with particular users. For instance, a unique route may be provided to the mobile device of each person based on a detected location of the person by live security cameras distributed throughout the house and/or a GPS location signal retrieved from the mobile device by the television receiver. The process flow within the example method 100 may further branch to step 110 where the television receiver operates one or more lighting devices, door locks, and/or window locks in the building structure to indicate to the occupant(s) the emergency exit path out of the house, or otherwise to a safety location located within or outside of the house. Further scenarios and/or beneficial aspects associated with mapping and facilitating evacuation routes in emergency situations are provided for by a television receiver are described in detail below in connection with the remaining figures.

It is noted that the term "lighting device(s)" as utilized herein refers to ambient lighting devices, for instance a light that may be used to illuminate a room. For instance, and merely by way of example, the lighting device(s) may include ceiling light fixtures, fan lights, lamps, desk lamps, floor lamps, light-up vanities, track lights, sconces, chandeliers, night lights, bathroom lights, and the like. It is contemplated that such lighting devices may be mounted onto a structure of room, such as a wall, ceiling column, or exposed beam, and/or provided on various furniture or flooring of the room for the purposes of illuminating that portion of the room, for instance, during standard use by occupants therein and/or for decorative purposes in a home. In this way, it is contemplated that the systems and methods disclosed herein may transform any standard lighting devices found and distributed throughout the home into emergency lights or evacuation route signals during an emergency situation.

Figure 2:
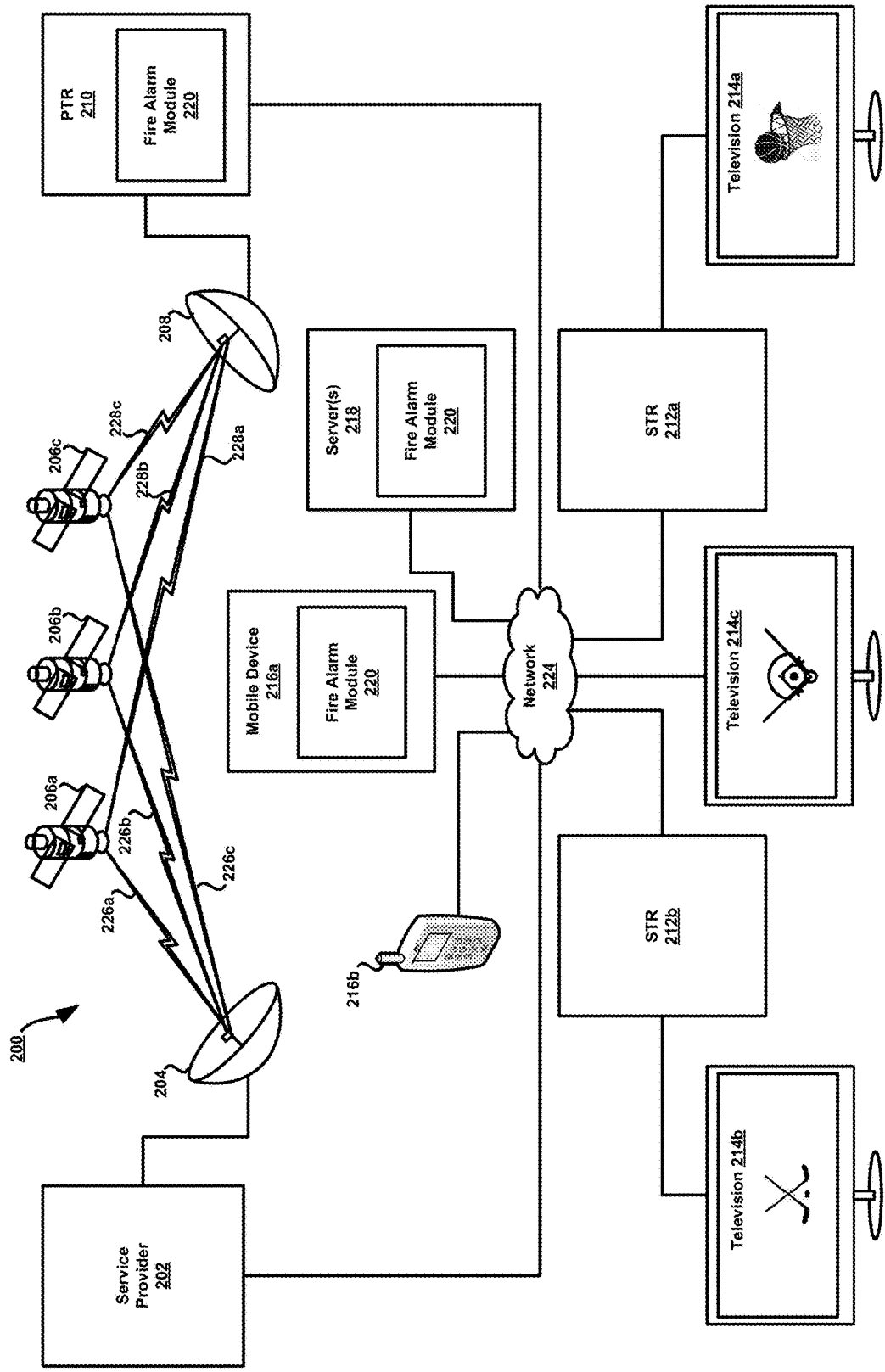
FIG. 2 shows an example content distribution system, according to various embodiments of the present disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include a service provider 202, a satellite uplink 204, a plurality of satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, and at least one server 218 that may in general be associated with or operated or implemented by the service provider 202. Additionally, the PTR 210, computing devices 216a-b, and server 218 may include or otherwise exhibit a fire alarm module 220. In general, and as discussed in further detail below, the fire alarm module 220 may be configured and/or arranged for mapping and facilitating evacuation routes in emergency situations directly from or via one or more interfaces that might normally be used to access satellite television-related programming and services, in accordance with the principles of the present disclosure.

The system 200 may further include at least one network 224 that establishes a bi-directional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among elements of the system 200.

The PTR 210, and the STRs 212a-b, as described throughout may generally be any type of television receiver, television converter, etc., such as a STB for example. In another example, the PTR 210, and the STRs 212a-b, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212a-b and televisions 214a-c, and possibly the computing devices 216a-b, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal, plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-c. Similar to the above-examples, the television channel may generally be presented live, or from a recording as previously stored on the PTR 210, and may be output to one or both of the computing devices 216a-c in accordance with a particular content protection technology and/or networking standard.

Figure 3:
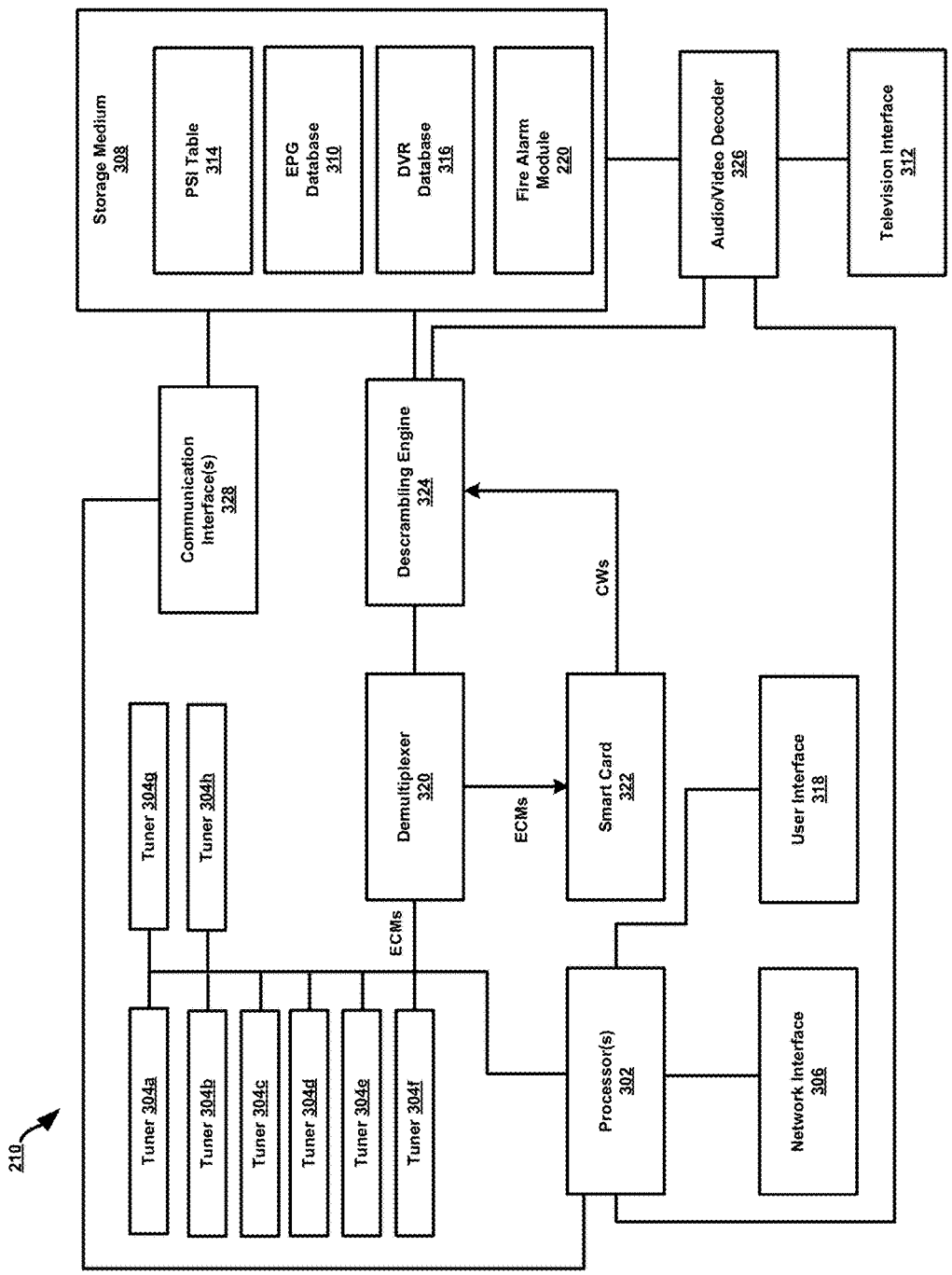
FIG. 3 shows an example block diagram of a television receiver of FIG. 2, according to various embodiments of the present disclosure.

Referring now to FIG. 3, an example block diagram of the PTR 210 of FIG. 2 is shown in accordance with the disclosure. In some examples, the STRs 312a-b may be configured in a manner similar to that of the PTR 210. In some examples, the STRs 312a-b may be configured and arranged to exhibit a reduced functionality as compared to the PTR 210, and may depend at least to a certain degree on the PTR 210 to implement certain features or functionality. The STRs 312a-b in this example may be each referred to as a "thin client."

The PTR 210 may include one or more processors 302, a plurality of tuners 304a-h, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, and at least one communication interface 328. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 206a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 206a-c, which may be unidirectional to the PTR 210, and another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the fire alarm 220 mentioned above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---|---|---|---|---|---|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

Figure 4:
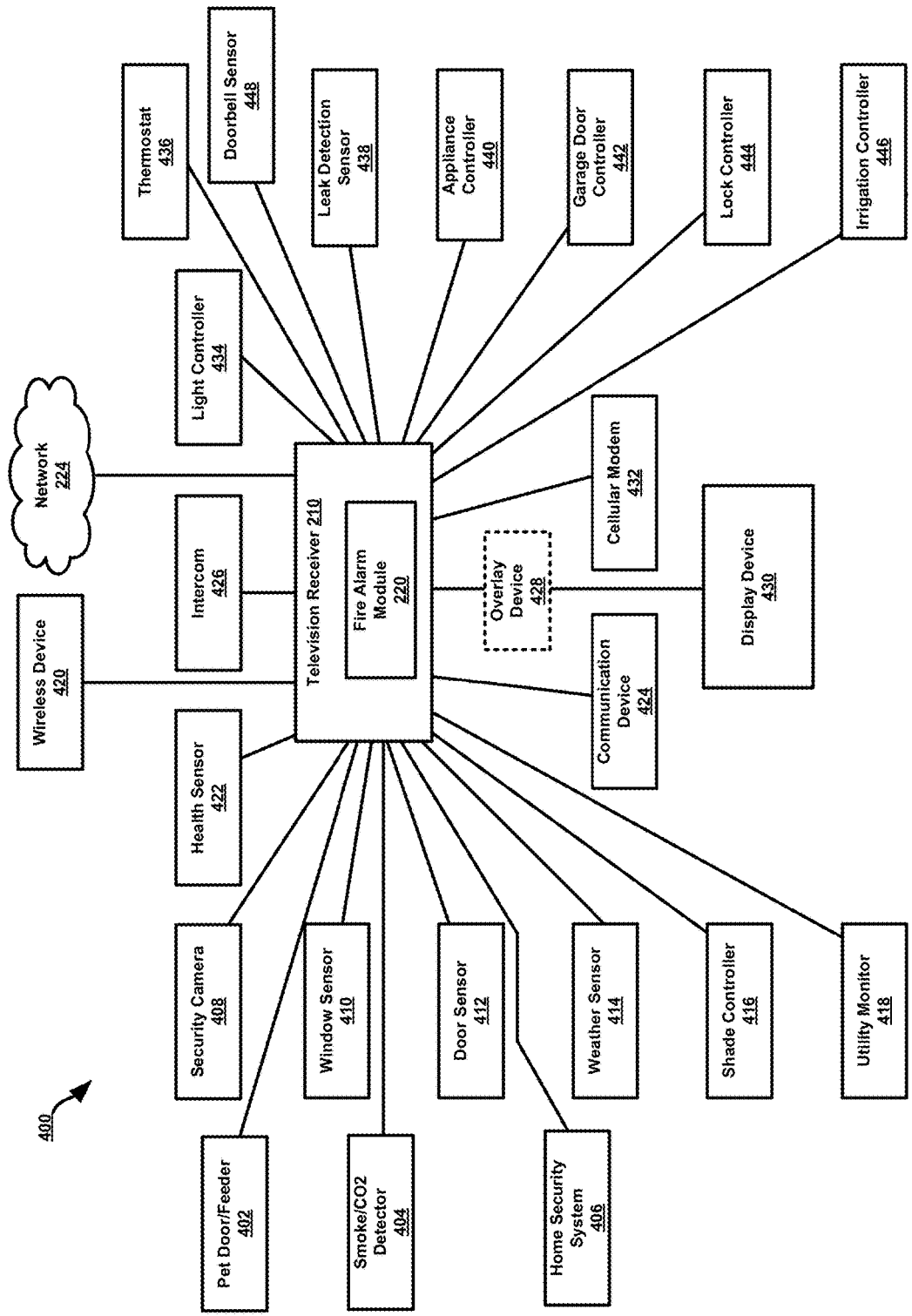
FIG. 4 shows an example home automation system, according to various embodiments of the present disclosure.

The communication interface 328 may be used by the PTR 210 to establish a communication link or connection between the PTR 210 and one or more of the computing systems and devices as shown in FIG. 2 and FIG. 4, discussed further below. It is contemplated that the communication interface 328 may take or exhibit any form as desired, and may be configured in a manner so as to be compatible with a like component or element incorporated within or to a particular one of the computing systems and devices as shown in FIG. 2 and FIG. 4, and further may be defined such that the communication link may be wired and/or or wireless. Example technologies consistent with the principles or aspects of the present disclosure may include, but are not limited to, Bluetooth®, WiFi, NFC (Near Field Communication), HomePlug®, and/or any other communication device or subsystem similar to that discussed below in connection with FIG. 9.

For brevity, the PTR 210 is depicted in a simplified form, and may generally include more or fewer elements or components as desired, including those configured and/or arranged for implementing various features for enabling an end-user to access home automation features or functionality directly from or via one or more interfaces that might normally be used to access satellite television-related programming and services, in accordance with the principles of the present disclosure. For example, the PTR 210 is shown in FIG. 3 to include the fire alarm 220 as mentioned above in connection with FIG. 2. While shown stored to the storage medium 308 as executable instructions, the fire alarm module 220 could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing.

It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Referring now to FIG. 4, an example home automation system 400 is shown in accordance with the present disclosure. In general, the home automation system 400 is hosted by the PTR 210 of FIG. 2, and thus the PTR 210 may be considered a home automation gateway device or system. For example, the PTR 210 may be configured and/or arranged to communicate with multiple in-home or on-residence home automation-related systems and/or devices. Some examples of which include, but are not limited to: at least one pet door/feeder 402, at least one smoke/$CO_2$ detector 404, a home security system 406, at least one security camera 408, at least one window sensor 410, at least one door sensor 412, at least one weather sensor 414, at least one shade controller 416, at least one utility monitor 418, at least one wireless device 420, at least one health sensor 422, at least one communication device 424, at least one intercom 426, at least one overlay device 428, at least one display device 430, at least one cellular modem 432, at least one light controller 434, at least one thermostat 436, at least one leak detection sensor 438, at least one appliance controller 440, at least one garage door controller 442, at least one lock controller 444, at least one irrigation controller 446, and at least one doorbell sensor 448. The home automation system 400 of FIG. 4 is just an example. Other examples are possible, as discussed further below.

It is contemplated that the each of the elements of FIG. 4, that which with the PTR 210 communicates, may use different communication standards. For instance, one or more elements may use or otherwise leverage a ZigBee® communication protocol, while one or more other devices may communicate with the PTR 210 using a Z-Wave® communication protocol. Other forms of wireless communication may be used by particular elements of FIG. 4 to enable communications to and from the PTR 210, such as any particular IEEE (Institute of Electrical and Electronics Engineers) standard or specification or protocol, such as the IEEE 802.11 technology for example.

In some examples, a separate device may be connected with the PTR 210 to enable communication with the smart home automation systems or devices of FIG. 4. For instance, the communication device 424 as shown coupled with the PTR 210 may take the form of a dongle. In some examples, the communication device 424 may be configured to allow for Zigbee®, Z-Wave®, and/or other forms of wireless communication. In some example, the communication device 424 may connect with the PTR 210 via a USB (Universal Serial Bus) port or via some other type of (e.g., wired) communication port. Accordingly, the communication device 424 may be powered by the PTR 210 or may be separately coupled with another different particular power source. In some examples, the PTR 210 may be enabled to communicate with a local wireless network and may use communication device in order to communicate with devices that use a ZigBee® communication protocol, Z-Wave® communication protocol, and/or some other wireless communication protocols.

In some examples, the communication device 424 may also serve to allow or enable additional components to be connected with the PTR 210. For instance, the communication device 424 may include additional audio/video inputs (e.g., HDMI), component, and/or composite inputs to allow for additional devices (e.g., Blu-Ray players) to be connected with the PTR 210. Such a connection may allow video comprising home automation information to be "overlaid" with television programming, both being output for display by a particular presentation device. Whether home automation information is overlaid onto video on display may be triggered based on a press of a remote control button by an end-user.

Regardless of whether the PTR 210 uses the communication device 242 to communicate with any particular home automation device shown in FIG. 4 or other particular home automation device not explicitly shown in FIG. 4, the PTR 210 may be configured to output home automation information for presentation via the display device 430. It is contemplated that the display device 430 could correspond to any particular one of the mobile devices 216a-b and televisions 214a-c as shown in FIG. 2. Still other examples are possible. Such information may be presented simultaneously, concurrently, in tandem, etc., with any particular television programming received by the PTR 210 via any particular communication channel as discussed above in connection with at least FIG. 2. It is further contemplated that the PTR 210 may also, at any particular instant or given time, output only television programming or only home automation information based on preferences or commands or selections of particular controls within an interface of or by any particular end-user. Furthermore, an end-user may be able to provide input to the PTR 210 to control the home automation system 400, in its entirety as hosted by the PTR 210 or by the overlay device 428, as discussed further below.

In some examples (indicated by intermittent line in FIG. 4), the overlay device 428 may be coupled with the PTR 210 to allow or enable home automation information to be presented via the display device 430. It is contemplated that the overlay device 428 may be configured and/or arranged to overlay information, such as home automation information, onto a signal that will ultimately enable the home automation information to be visually presented via the display device 430. In this example, the PTR 210 may receive, decode, descramble, decrypt, store, and/or output television programming. The PTR 210 may output a signal, such as in the form of an HDMI signal. Rather than being directly input to the display device 430, however, the output of the PTR 210 may be input to the overlay device 428. Here, the overlay device 428 may receive the video and/or audio output from the PTR 210.

The overlay device 428 may add additional information to the video and/or audio signal received from the PTR 210 so as to modify or augment or even "piggyback" on the same. That video and/or audio signal may then be output by the overlay device 428 to the display device 430 for presentation thereon. In some examples, the overlay device 428 may include or exhibit an HDMI input/output, with the HDMI output being connected to the display device 430. While FIG. 4 shows lines illustrating communication between the PTR 210 and other various devices, it will be appreciated that such communication may exist, in addition or in alternate via the communication device 424 and/or the overlay device 428. In other words, any particular input to the PTR 210 as shown in FIG. 4 may additionally, or alternatively, be supplied as input to one or both of the communication device 424 and the overlay device 428.

As alluded to above, the PTR 210 may be used to provide home automation functionality, but the overlay device 428 may be used to modify a particular signal so that particular home automation information may be presented via the display device 430. Further, the home automation functionality as detailed throughout in relation to the PTR 210 may alternatively be provided by or via the overlay device 428. Using the overlay device 428 to present automation information via the display device 430 may be beneficial and/or advantageous in many respects. For instance, it is contemplated that multiple devices may provide input video to the overlay device 428. For instance, the PTR 210 may provide television programming to the overlay device 428, a DVD/Blu-Ray player may provide video to the overlay device 428, and a separate IPTV device may stream other programming to the overlay device 428. Regardless of the source of particular video/audio, the overlay device 428 may output video and/or audio that has been modified or augmented, etc., to include home automation information and then output to the display device 430. As such, regardless of the source of video/audio, the overlay device 428 may modify the audio/video to include home automation information and, possibly, solicit for user input. For instance, in some examples the overlay device 428 may have four video inputs (e.g., four HDMI inputs) and a single video output (e.g., an HDMI output). In other examples, the PTR 210 may exhibit such features or functionality. As such, a separate device, such as a Blu-ray player may be connected with a video input of the PTR 210, thus allowing the PTR 210 to overlay home automation information when content from the Blu-Ray player is being output to the display device 430.

Regardless of whether the PTR 210 is itself configured to provide home automation functionality and output home automation input for display via the display device 430 or such home automation functionality is provided via the overlay device 428, home automation information may be presented by the display device 430 while television programming is also being presented by display device 430. For instance, home automation information may be overlaid or may replace a portion of television programming, such as broadcast content, stored content, on-demand content, etc., presented via the display device 430. As an example, while television programming consisting of a baseball game is being presented, the display may be augmented with information related to home automation by instruction of the PTR 210 which is configured to host the home automation system 400 in accordance with the principles of the present disclosure. In general, the television programming may represent broadcast programming, recorded content, on-demand content, or some other form of content. The exemplary illustrated home automation information is related to a detected fire signal, such as information regarding the detected fire signal, and an emergency exit route, user-instructions for responding to a valid fire signal and/or an unwanted or false fire signal, and/or live video feed from a room in which the fire signal was detected. In another example, the displayed home automation information may be related to a user settings or control panel, such as a graphical user interface ("GUI"), that receives various user selections and settings. Such augmentation of the television programming may be performed directly by the PTR 210 (which may or may not be in communication with the communication device 242), the overlay device 428, or even a combination thereof. Such augmentation may result in solid or opaque or partially transparent graphics being overlaid onto television programming (or other forms of video) output by the PTR 210 and displayed by the television 214c. Furthermore, the overlay device 428 and/or the PTR 210 may add or modify sound to television programming also or alternatively. For instance, in response to a doorbell ring, a sound may be played through the television 214c (or connected audio system). In addition or in alternate, a graphic may be displayed. In other examples, other particular camera data (e.g., camera data) and/or associated sound or motion sensors may be integrated in the system and overlaid or otherwise made available to a user. For example, detection of the fire signal may trigger an on-screen alert to a user watching television.

Still further, such presented home automation information may request or at least enable end-user user input. For instance, an end-user may, via section of one or more controls of a particular interface output by the PTR 210 (e.g., via a remote control) and/or the overlay device 428, specify whether video from a camera at the front door should be presented, not presented, or if future notifications related to such motion such be ignored. If ignored, this may be for a predefined period of time, such as an hour, or until the PTR 210 or the overlay device 428 is powered down and powered back on. Ignoring of video may be particularly useful if motion or some other event is triggering the presentation of video that is not interesting to a viewer of the display device 430 (or a wireless device), such as children playing on the lawn or snow falling.

Returning to FIG. 4 alone, the PTR 210 and/or the overlay device 428, depending on implementation-specific details, may communicate with one or more wireless devices, such as the wireless device 420. The wireless device 420 may represent a tablet computer, cellular phone, laptop computer, remote computer, or some other device through which a user may desire to control home automation settings and view home automation information in accordance with the principles of the present disclosure. Such a device also need not necessarily be wireless, such as in a desktop computer embodiment. It is contemplated that the PTR 210, communication device 424, and/or the overlay device 428 may communicate directly with the wireless device 420, or may use a local wireless network, such as network 224 for instance. The wireless device 420 may be remotely located and not connected with a same local wireless network as one or more of the other devices or elements of FIG. 4. Via the Internet, the PTR 210 and/or the overlay device 428 may transmit a notification to the wireless device 420 regarding home automation information. For instance, a third-party notification server system, such as a notification server system operated by Apple Inc., of Cupertino, Calif. may be used to send such notifications to the wireless device 420.

Various home automation devices may be in communication with the fire alarm module 220 of the PTR 210 (collectively, "PTR 210" throughout) and/or the overlay device 428, depending on implementation-specific details. Such home automation devices may use similar or disparate communication protocols. Such home automation devices may communicate with the PTR 210 directly or via the communication device 424. Such home automation devices may be controlled by a user and/or have a status viewed by a user via the display device 430 and/or wireless device 420. Such home automation devices may include, but are not limited to:

One or more cameras, such as the security camera 408. It is contemplated that the security camera 408 may be installed indoors, outdoors, and may provide a video and, possibly, an audio stream that may be presented via the wireless device 420 and/or display device 430. Video and/or audio from the security camera 408 may be recorded by the overlay device 428 and/or the PTR 210 continuously, in a loop as per a predefined time period, upon an event occurring, such as motion being detected by the security camera 408, and etc. For example, video and/or audio from security camera 408 may be continuously recorded such as in the form of a rolling window, thus allowing a period of time of video/audio to be reviewed by a user from before a triggering event and after the triggering event. Video/audio may be recorded on a persistent storage device local to overlay device 428 and/or the PTR 210, and/or may be recorded and stored on an external storage devices, such as a network attached storage device or the server 218 of FIG. 2. In some examples, video may be transmitted across a local and/or wide area network to other one or more other storage devices upon occurrence of a trigger event, for later playback. For initial setup for example, a still may be captured by the security camera 408 and stored by the PTR 210 for subsequent presentation as part of a user interface via the display device 430. In this way, an end-user can determine which camera, if multiple cameras are present or enabled, is being set up and/or later accessed. For example, a user interface may display a still image from a front door camera which may be easily recognized by the user because it shows a scene near or adjacent a front door of a residence, to allow a user to select the front door camera for viewing as desired.

Furthermore, video and, possibly, audio from the security camera 408 may be available live for viewing by a user via the overlay device 428 or the PTR 210. Such video may be presented simultaneously with television programming being presented. In some examples, video may only be presented if motion is detected by the security camera 408, otherwise video from the security camera 408 may not be presented by a particular display device presenting television programming Also, such video (and, possibly, audio) from the security camera 408 may be recorded by the PTR 210 and/or the overlay device 428. As discussed in further detail below in connection with at least FIG. 8, such video may be recorded based upon a user-configurable timer. For instance, features or functionality associated with the security camera 408 may be incorporated into an EPG that is output by the PTR 210 for display by a presentation or display device.

For instance, data as captured by the security camera 408 may be presented or may otherwise be accessible as a "channel" as part of the EPG along with other typical or conventional television programming channels. Accordingly, a user may be permitted to select that channel associated with the security camera 408 to access data as captured by the security camera 408 for presentation via the display device 430 and/or the wireless device 420, and etc. The user may also be permitted to set a timer to activate the security camera 408 to record video and/or audio for a user-defined period of time on a user-defined date. Such recording may not be constrained by the rolling window mentioned above associated with a triggering event being detected. Such an implementation may be beneficial, for example, if a babysitter is going to be watching a child and the parents want to later review the babysitter's behavior in their absence. In some examples, video and/audio acquired by the security camera 408 may be backed up to a remote storage device, such as cloud-based storage hosted by the server 218 of FIG. 3 for instance. Other data may also be cached to the cloud, such as configuration settings. Thus, if one or both of the PTR 210 and overlay device 428 malfunction, then a new device may be installed and the configuration data loaded onto the device from the cloud.

Further, one or more window sensors and door sensors, such as the window sensor 410 and the door sensor 412 may be integrated in to or as part of the home automation system 400, and each may transmit data to the PTR 210, possibly via the communication device 424, or the overlay device 428, that indicates the status of a window or door, respectively. Such status may indicate open window or door, an ajar window or door, a closed window or door, whether the window or door is locked, and etc. When a status change occurs, an end-user may be notified as such via the wireless device 420 and/or the display device 430, within an EPG or like interface for example. Further, a user may be able to view a status screen within an EPG or other interface to view the status one or more window sensors and/or one or more door sensors throughout the location. In some examples, the window sensor 410 and/or the door sensor 412 may have integrated "break" sensors to enable a determination as to whether glass or a hinge, or other integral component, etc., has been broken or compromised. Here, as well as in all instances of home automation related data as acquired and served to the PTR 210 and/or overlay device 428 by particular elements of FIG. 4, it is contemplated that one or both of the window sensor 410 and the door sensor 412 may be controlled via interaction with particular controls as provided within or by an EPG or like interface, and information or data as acquired by one or both of the window sensor 410 and door sensor 412 may be manipulated, consolidated, etc., as desired, and also made accessible within or by an EPG or like interface, such as a pop-up window, banner, and/or any other "interface" or "display" or the like, in accordance with the principles of the present disclosure.

Further, one or more smoke and/or $CO_2$ detectors, such as detector 404, may be integrated in to or as part of the home automation system 400. As such, alerts as to whether a fire (e.g., heat, smoke), $CO_2$, radon, etc., has been detected can be sent to the PTR 210, wireless device 420, etc., and/or one or more emergency first responders. Accordingly, when an alert occurs, a user may be notified as such the via wireless device 420 or the display device 430, within an EPG or like interface for example. Further, it is contemplated that such an interface may be utilized to disable false alarms, and that one or more sensors dispersed throughout a residence and/or integrated within the home automation system 400 to detect gas leaks, radon, or various other dangerous situations. Here, as well as in all instances of home automation related data as acquired and served to the PTR 210 and/or overlay device 428 by particular elements of FIG. 4, the detector 404 may be controlled via interaction with particular controls as provided within or by an EPG or like interface, and information or data as acquired by the detector 404 may be manipulated, consolidated, etc., as desired, and also made accessible within or by an EPG or like interface in accordance with the principles of the present disclosure.

Further, a pet door and/or feeder, such as pet door and/or feeder 402 may be integrated in to or as part of the home automation system 400. For instance, a predefined amount of food may be dispensed at predefined times to a pet. A pet door may be locked and/or unlocked. The pet's weight or presence may trigger the locking or unlocking of the pet door. For instance, a camera located at the pet door may be used to perform image recognition of the pet or a weight sensor near the door may identify the presence of the pet and unlock the door. A user may also lock/unlock a pet door and/or dispense food for example from a "remote" location. Here, as well as in all instances of home automation related data as acquired and served to the PTR 210 and/or overlay device 428 by particular elements of FIG. 4, the pet door and/or feeder 402 may be controlled via interaction with particular controls as provided within or by an EPG or like interface, and information or data as acquired by the pet door and/or feeder 402 may be consolidated, summarized, etc., and made accessible within or by an EPG or like interface in accordance with the principles of the present disclosure.

Further, a weather sensor, such as the weather sensor 414 may be integrated in to or as part of the home automation system 400, and may allow or enable the PTR 210 and/or overlay device 428 to receive, identify, and/or output various forms of environmental data, including local or non-local ambient temperature, humidity, wind speed, barometric pressure, etc. Here, as well as in all instances of home automation related data as acquired and served to the PTR 210 and/or overlay device 428 by particular elements of FIG. 4, the weather sensor 414 may be controlled via interaction with particular controls as provided within or by an EPG or like interface, and information or data as acquired by the pet door and/or feeder 402 may be manipulated, consolidated, etc., as desired, and also made accessible within or by an EPG or like interface in accordance with the principles of the present disclosure.

Further, a shade controller, such as shade controller 416, may be integrated in to or as part of the home automation system 400, and may allow for control of one or more shades, such as window, door, and/or skylight shades, within a home or residence or any other location. The shade controller 416 may respond to commands received from the PTR 210 and/or overlay device 428 and may provide status updates, such as "shade up" or "shade 50% up" or "shade down" and etc. Here, as well as in all instances of home automation related data as acquired and served to the PTR 210 and/or overlay device 428 by particular elements of FIG. 4, the shade controller 416 may be controlled via interaction with particular controls as provided within or by an EPG or like interface, and information or data as acquired by the shade controller 416 may be manipulated, consolidated, etc., as desired, and also made accessible within or by an EPG or like interface in accordance with the principles of the present disclosure.

Further, a utility monitor, such as utility monitor 418, may be integrated in to or as part of the home automation system 400, and may serve to provide the PTR 210 and/or overlay device 428 with utility data or information, such as electricity usage, gas usage, water usage, wastewater usage, irrigation usage, etc. A user may via an EPG or like interface view a status page or may receive notifications upon predefined events occurring, such as electricity usage exceeding a defined threshold within a month, or current kilowatt usage exceeding a threshold. Here, as well as in all instances of home automation related data as acquired and served to the PTR 210 and/or overlay device 428 by particular elements of FIG. 4, the utility monitor 418 may be controlled via interaction with particular controls as provided within or by an EPG or like interface, and information or data as acquired by the utility monitor 418 may be manipulated, consolidated, etc., as desired, and also made accessible within or by an EPG or like interface in accordance with the principles of the present disclosure.

Further, a health sensor, such as health sensor 422, may be integrated in to or as part of the home automation system 400, and may permit one or more vital characteristics of a particular individual to be acquired and/or monitored, such as a heart rate for instance. In some examples, additionally or alternatively, the health sensor 422 may contain a button or other type of actuator that a user can press to request assistance. As such, the health sensor 422 may be mounted to a fixed location, such as bedside, or may be carried by a user, such as on a lanyard. Such a request may trigger a notification to be presented to other users via the display device 430 and/or the wireless device 420. Additionally or if the notification is not cleared by another user within a predefined period of time, a notification may be transmitted to emergency first responders to request help. In some examples, a home automation service provider may first try contacting the user, such as via phone, to determine if an emergency is indeed occurring. Such a health sensor 422 may have additional purposes, such as for notification of another form of emergency, such as a break-in, fire, flood, theft, disaster, etc.

In some examples, the health sensor 422 may be used as a medical alert pendant that can be worn or otherwise carried by an individual. It may contain a microphone and/or speaker to allow communication with other users and/or emergency first responders. The PTR 210 and/or overlay device 428 may be preprogrammed to contact a particular phone number, such as an emergency service provider, relative, caregiver, etc., based on an actuator of the health sensor 422 being activated by a user. The user may be placed in contact with a person via the phone number and the microphone and/or speaker of the health sensor 422. Furthermore, camera data may be combined with such alerts in order to give a contacted relative more information regarding the medical situation. For example, the health sensor 422, when activated in the family room, may generate a command which is linked with security camera footage from the same room. Furthermore, in some examples, the health sensor 422 may be able to monitor vitals of a user, such as a blood pressure, temperature, heart rate, blood sugar, etc. In some examples, an event, such as a fall or exiting a structure can be detected.

Further, in response to an alert from the health sensor 422 or some other emergency or noteworthy event, parallel notifications may be sent to multiple users at approximately the same time. As such, multiple people can be made aware of the event at approximately the same time (as opposed to serial notification). Therefore, whoever the event is most pertinent to or notices the notification first can respond. Which users are notified for which type of event may be customized by a user of the PTR 210. In addition to such parallel notifications being based on data from the health sensor 422, data from other devices may trigger such parallel notifications. For instance, a mailbox open, a garage door open, an entry/exit door open during wrong time, an unauthorized control of specific lights during vacation period, a water sensor detecting a leak or flow, a temperature of room or equipment is outside of defined range, and/or motion detected at front door are examples of possible events which may trigger parallel notifications.

Additionally, a configuring user may be able to select from a list of users to notify and method of notification to enable such parallel notifications. The configuring user may prioritize which systems and people are notified, and specify that the notification may continue through the list unless acknowledged either electronically or by human interaction. For example, the user could specify that they want to be notified of any light switch operation in their home during their vacation. Notification priority could be: 1) SMS Message; 2) push notification; 3) electronic voice recorder places call to primary number; and 4) electronic voice recorder places call to spouse's number. Other examples are possible, however, it is contemplated that the second notification may never happen if the user replies to the SMS message with an acknowledgment. Or, the second notification would automatically happen if the SMS gateway cannot be contacted. Here, as well as in all instances of home automation related data as acquired and served to the PTR 210 and/or overlay device 428 by particular elements of FIG. 4, the health sensor 422 may be controlled via interaction with particular controls as provided within or by an EPG or like interface, and information or data as acquired by the health sensor 422 may be manipulated, consolidated, etc., as desired, and also made accessible within or by an EPG or like interface in accordance with the principles of the present disclosure.

Further, an intercom, such as the intercom 426, may be integrated in to or as part of the home automation system 400, and may permit a user in one location to communicate with a user in another location, who may be using the wireless device 420, the display device 430, or some other device, such another television receiver within the structure. The intercom 426 may be integrated with the security camera 408 or may use a dedicated microphone/speaker, such as a Bluetooth® microphone. Microphones/speakers of the wireless device 420, display device 430, communication device 242, overlay device 428, etc., may also or alternatively be used. A MOCA network or other appropriate type of network may be used to provide audio and/or video from the intercom 426 to the PTR 210 and/or to other television receivers and/or wireless devices in communication with the PTR 210. Here, as well as in all instances of home automation related data as acquired and served to the PTR 210 and/or overlay device 428 by particular elements of FIG. 4, the intercom 426 may be controlled via interaction with particular controls as provided within or by an EPG or like interface, and information or data as acquired by the intercom 426 may be manipulated, consolidated, etc., as desired, and also made accessible within or by an EPG or like interface in accordance with the principles of the present disclosure.

Further, a light controller, such as light controller 434, may be integrated in to or as part of the home automation system 400, and may permit a light to be turned on, off, and/or dimmed by the PTR 210 or the overlay device 428, such as based on a user command received from the wireless device 420 or directly via PTR 210 or overlay device 428, etc. The light controller 434 may control a single light. As such, multiple different ones of the light controller 434 may be present within a house or residence. In some examples, a physical light switch, that opens and closes a circuit of the light, may be left in the "on" position such that light controller 434 can be used to control whether the light is on or off. The light controller 434 may be integrated into a light bulb or a circuit, such as between the light fixture and the power source, to control whether the light is on or off. An end-user, via the PTR 210 or overlay device 428, may be permitted to view a status of each instance of the light controller 434 within a location.

Since the PTR 210 or overlay device 428 may communicate using different home automation protocols, different instances of the light controller 434 within a location may use disparate or different communication protocols, but may all still be controlled by the PTR 210 or overlay device 428. In some examples, wireless light switches may be used that communicate with the PTR 210 or overlay device 428. Such switches may use a different communication protocol than any particular instance of the light controller 434. Such a difference may not affect functionality because the PTR 210 or overlay device 428 can serve as a hub for multiple disparate communication protocols and perform any necessary translation and/or bridging functions. For example, a tablet computer may transmit a command over a WiFi connection and the PTR 210 or overlay device 428 may translate the command into an appropriate Zigbee® or Zwave® command for a wireless light bulb. In some examples, the translation may occur for a group of disparate or different devices. For example, a user may decide to turn off all lights in a room and select a lighting command on a tablet computer, the overlay device 428 may then identify the lights in the room and output appropriate commands to all devices over different protocols, such as a Zigbee® wireless light bulb and a Zwave® table lamp.

Additionally, it is contemplated that the PTR 210 may permit timers and/or dimmer settings to be set for lights via the light controller 434. For instance, lights can be configured to turn on/off at various times during a day according to a schedule and/or events being detected by the home automation system 400, etc. Here, as well as in all instances of home automation related data as acquired and served to the PTR 210 and/or overlay device 428 by particular elements of FIG. 4, each particular instance of the light controller 434 may be controlled via interaction with particular controls as provided within or by an EPG or like interface, and information or data as acquired by each particular instance of the light controller 434 may be manipulated, consolidated, etc., as desired, and also made accessible within or by an EPG or like interface in accordance with the principles of the present disclosure.

Further, a thermostat, such as the thermostat 436, may be integrated in to or as part of the home automation system 400, and may provide heating/cooling updates to the PTR 210 and/or overlay device 428 for display via display device 430 and/or wireless device 420. Further, control of thermostat 436 may be effectuated via the PTR 210 or overlay device 428, and zone control within a structure using multiple thermostats may also be possible. Here, as well as in all instances of home automation related data as acquired and served to the PTR 210 and/or overlay device 428 by particular elements of FIG. 4, the thermostat 436 may be controlled via interaction with particular controls as provided within or by an EPG or like interface, and information or data as acquired by the thermostat 436 may be manipulated, consolidated, etc., as desired, and also made accessible within or by an EPG or like interface in accordance with the principles of the present disclosure.

Further, a leak detection sensor, such as the leak detection sensor 438, may be integrated in to or as part of the home automation system 400, and may be used to determine when a water leak as occurred, such as in pipes supplying water-based fixtures with water. The leak detection sensor 438 may be configured to attach to the exterior of a pipe and listen for a sound of water moving within a pipe. In other examples, sonar, temperature sensors or ion infused water with appropriate sensors may be used to detect moving water. As such, cutting or otherwise modifying plumbing may not be necessary to use or leverage the leak detection sensor 438. If water movement is detected for greater than a threshold period of time, it may be determined a leak is occurring. The leak detection sensor 438 may have a component that couples over an existing valve such that the flow of water within one or more pipes can be stopped.

For instance, if the leak detection sensor 438 determines a leak may be occurring, a notification may be provided to a user via the wireless device 420 and/or display device 430 by the PTR 210 and/or overlay device 428. If a user does not clear the notification, the flow of water may be shut off by the leak detection sensor 438 after a predefined period of time. A user may also be able to provide input to allow the flow of water to continue or to immediately interrupt the flow of water. Here, as well as in all instances of home automation related data as acquired and served to the PTR 210 and/or overlay device 428 by particular elements of FIG. 4, the leak detection sensor 438 may be controlled via interaction with particular controls as provided within or by an EPG or like interface, and information or data as acquired by the leak detection sensor 438 may be manipulated, consolidated, etc., as desired, and also made accessible within or by an EPG or like interface in accordance with the principles of the present disclosure.

Further, an applicant controller, such as the appliance controller 440, may be integrated in to or as part of the home automation system 400, and may permit a status of an appliance to be retrieved and commands to control operation to be sent to an appliance by the PTR 210 or overlay device 428. For instance, the appliance controller 440 may control a washing machine, a dryer, a dishwasher, an oven, a microwave, a refrigerator, a toaster, a coffee maker, a hot tub, or any other form of appliance. The appliance controller 440 may be connected with a particular appliance or may be integrated as part of the appliance. Additionally, or alternatively, the appliance controller 440 may enable for acquisition of data or information regarding electricity usage of one or more devices (e.g., other home automation devices or circuits within a home that are monitored) to be determined Here, as well as in all instances of home automation related data as acquired and served to the PTR 210 and/or overlay device 428 by particular elements of FIG. 4, the appliance controller 440 may be controlled via interaction with particular controls as provided within or by an EPG or like interface, and information or data as acquired by the appliance controller 440 may be manipulated, consolidated, etc., as desired, and also made accessible within or by an EPG or like interface in accordance with the principles of the present disclosure.

Further, a garage door controller, such as the garage door controller 442, may be integrated in to or as part of the home automation system 400, and may permit a status of a garage door to be checked and the door to be opened or closed by a user via the PTR 210 or overlay device 428. In some examples, based on a physical location of the wireless device 420, the garage door may be controlled. For instance, if the wireless device 420 is a cellular phone and it is detected to have moved a threshold distance away from a house having the garage door controller 442 installed, a notification may be sent to the wireless device 420. If no response is received within a threshold period of time, the garage may be automatically shut. If the wireless device 420 moves within a threshold distance of the garage door controller 442, the garage may be opened. Here, as well as in all instances of home automation related data as acquired and served to the PTR 210 and/or overlay device 428 by particular elements of FIG. 4, the garage door controller 442 may be controlled via interaction with particular controls as provided within or by an EPG or like interface, and information or data as acquired by the garage door controller 442 may be manipulated, consolidated, etc., as desired, and also made accessible within or by an EPG or like interface in accordance with the principles of the present disclosure.

Further, a lock controller, such as the lock controller 444, may be integrated in to or as part of the home automation system 400, and may permit a door to be locked and unlocked and/or monitored by a user via the PTR 210 or overlay device 428. In some examples, the lock controller 444 may have an integrated door sensor 412 to determine if the door is open, shut, or partially ajar. Being able to only determine if a door is locked or unlocked may not be overly useful—for instance, a lock may be in a locked position, but if the door is ajar, the lock may not prevent access to the house. Therefore, for security, a user may benefit from knowing both that a door is closed (or open) and locked (or unlocked). To accomplish such notification and control, the lock controller 444 may have an integrated door sensor 412 that allows for the lock controller 444 to lock/unlock a door and provide a status as to whether the door is open or shut. Therefore, a single device may control a lock and determine whether the associated door is shut or open. No mechanical or electrical component may need to be integrated separately into a door or doorframe to provide such functionality. Such a single device may have a single power source that allows for sensing of the lock position, sensing of the door position, and for engagement/disengagement of the lock.

For example, the lock controller 444 may have an integrated door sensor that includes a reed switch or proximity sensor that detects when the door is in a closed position, with a plate of the lock in proximity to a plate on the door frame of the door. For instance, a plate of the lock may have an integrated magnet or magnetized doorframe plate. When in proximity to the magnet, a reed switch located in the lock controller 444 may be used to determine that the door is closed; when not in proximity to the magnet, the reed switch located in the lock controller 444 may be used to determine that the door is at least partially ajar. Rather than using a reed switch, other forms of sensing may also be used, such as a proximity sensor to detect a doorframe. In some examples, the sensor to determine the door is shut may be integrated directly into the deadbolt or other latching mechanism of the lock controller 444. When the deadbolt is extended, a sensor may be able to determine if the distal end of the deadbolt is properly latched within a door frame based on a proximity sensor or other sensing means. Here, as well as in all instances of home automation related data as acquired and served to the PTR 210 and/or overlay device 428 by particular elements of FIG. 4, the lock controller 444 may be controlled via interaction with particular controls as provided within or by an EPG or like interface, and information or data as acquired by the lock controller 444 may be manipulated, consolidated, etc., as desired, and also made accessible within or by an EPG or like interface in accordance with the principles of the present disclosure.

Further, a home security system, such as the home security system 406, may be integrated in to or as part of the home automation system 400. In general, the home security system 406 may detect motion, when a user has armed/disarmed the home security system 406, when windows/doors are opened or broken, etc. The PTR 210 may adjust settings of the home automation devices of FIG. 4 based on home security system 406 being armed or disarmed. For example, a virtual control and alarm panel may be presented to a user via the display device 430. The functions of a wall mounted panel alarm can be integrated in the graphical user interface of the TV viewing experience such as a menu system with an underlying tree hierarchical structure. It is contemplated that the virtual control and alarm panel can appear in a full screen or PiP (Picture-in-Picture) with TV content. Alarms and event notification can be in the form of scrolling text overlays, popups, flashing icons, etc.

Additionally, camera video and/or audio, such as from the security camera 408, can be integrated with DVR content provided by the PTR 210 with additional search, zoom, time-line capabilities. The camera's video stream can be displayed full screen, PiP with TV content, or as a tiled mosaic to display multiple camera's streams at a same time. In some examples, the display can switch between camera streams at fixed intervals. The PTR 210 may perform video scaling, adjust frame rate and transcoding on video received from the security camera 408. In addition, the PTR 210 may adaptively transcode the camera content to match an Internet connection. Here, as well as in all instances of home automation related data as acquired and served to the PTR 210 and/or overlay device 428 by particular elements of FIG. 4, the home security system 406 may be controlled via interaction with particular controls as provided within or by an EPG or like interface, and information or data as acquired by the home security system 406 may be manipulated, consolidated, etc., as desired, and also made accessible within or by an EPG or like interface in accordance with the principles of the present disclosure.

Further, an irrigation controller, such as the irrigation controller 446, may be integrated in to or as part of the home automation system 400, and may allow for a status and control of an irrigation system, such as a sprinkler system, to be controlled by a user via the PTR 210 and/or overlay device 428. The irrigation controller 446 may be used in conjunction with the weather sensor 414 to determine whether and/or for how long (duration) the irrigation controller 446 should be activated for watering. Further, a user, via the PTR 210 and/or overlay device 428, may turn on, turn off, or adjust settings of the irrigation controller 446. Here, as well as in all instances of home automation related data as acquired and served to the PTR 210 and/or overlay device 428 by particular elements of FIG. 4, the irrigation controller 446 may be controlled via interaction with particular controls as provided within or by an EPG or like interface, and information or data as acquired by the irrigation controller 446 may be manipulated, consolidated, etc., as desired, and also made accessible within or by an EPG or like interface in accordance with the principles of the present disclosure.

Further, a doorbell sensor, such as the doorbell sensor 448, may be integrated in to or as part of the home automation system 400, and may permit an indication of when a doorbell has been rung to be sent to multiple devices, such as the PTR 210 and/or the wireless device 420. In some examples, the doorbell sensor 448 detecting a doorbell ring may trigger video to be recorded by the security camera 408 of the area near the doorbell and the video to be stored until deleted by a user, or stored for predefined period of time. Here, as well as in all instances of home automation related data as acquired and served to the PTR 210 and/or overlay device 428 by particular elements of FIG. 4, the doorbell sensor 448 may be controlled via interaction with particular controls as provided within or by an EPG or like interface, and information or data as acquired by the doorbell sensor 448 may be manipulated, consolidated, etc., as desired, and also made accessible within or by an EPG or like interface in accordance with the principles of the present disclosure.

For example, "selection" of a doorbell by an individual so as to "trigger" the doorbell sensor 448 may activate or engage the PTR 210 to generate and output for display by a presentation device, such as the television 214c, a user interface, display, pop-up, etc., that which may include particular information such as "There is someone at your front door ringing the doorbell" for example. Additional, or alternative, actions such as activating, by the PTR 210, a security camera to record video and/or audio of the individual at the front door are contemplated as well. Further, similar steps or actions may be taken or implemented by the PTR 210 for example in response to a signal generated in response to detection of an event, etc., received by the PTR 210 from any of the elements of FIG. 2.

Additional forms of sensors not illustrated in FIG. 2 may also be incorporated as part of the home automation system 400. For instance, a mailbox sensor may be attached to a mailbox to determine when mail is present and/or has been picked up. The ability to control one or more showers, baths, and/or faucets from the PTR 210 and/or the wireless device 420 may also be possible. Pool and/or hot tub monitors may be incorporated into the home automation system 400. Such sensors may detect whether or not a pump is running, water temperature, pH level, a splash/whether something has fallen in, etc. Further, various characteristics of the pool and/or hot tub may be controlled via the home automation system. In some examples, a vehicle "dashcam" may upload or otherwise make video/audio available to the PTR 210 when within range of a particular residence. For instance, when a vehicle has been parked within range of a local wireless network with which the PTR 210 is connected, video and/or audio may be transmitted from the dashcam to the PTR 210 for storage and/or uploading to a remote server, such as the server 218 as shown in FIG. 2. Here, as well as in all instances of home automation related data as acquired and served to the PTR 210 and/or overlay device 428 by particular elements of FIG. 4, such systems or sensors or devices may be controlled via interaction with particular controls as provided within or by an EPG or like interface, and information or data as acquired by such systems or sensors or devices may be manipulated, consolidated, etc., as desired, and also made accessible within or by an EPG or like interface in accordance with the principles of the present disclosure.

Figure 5:
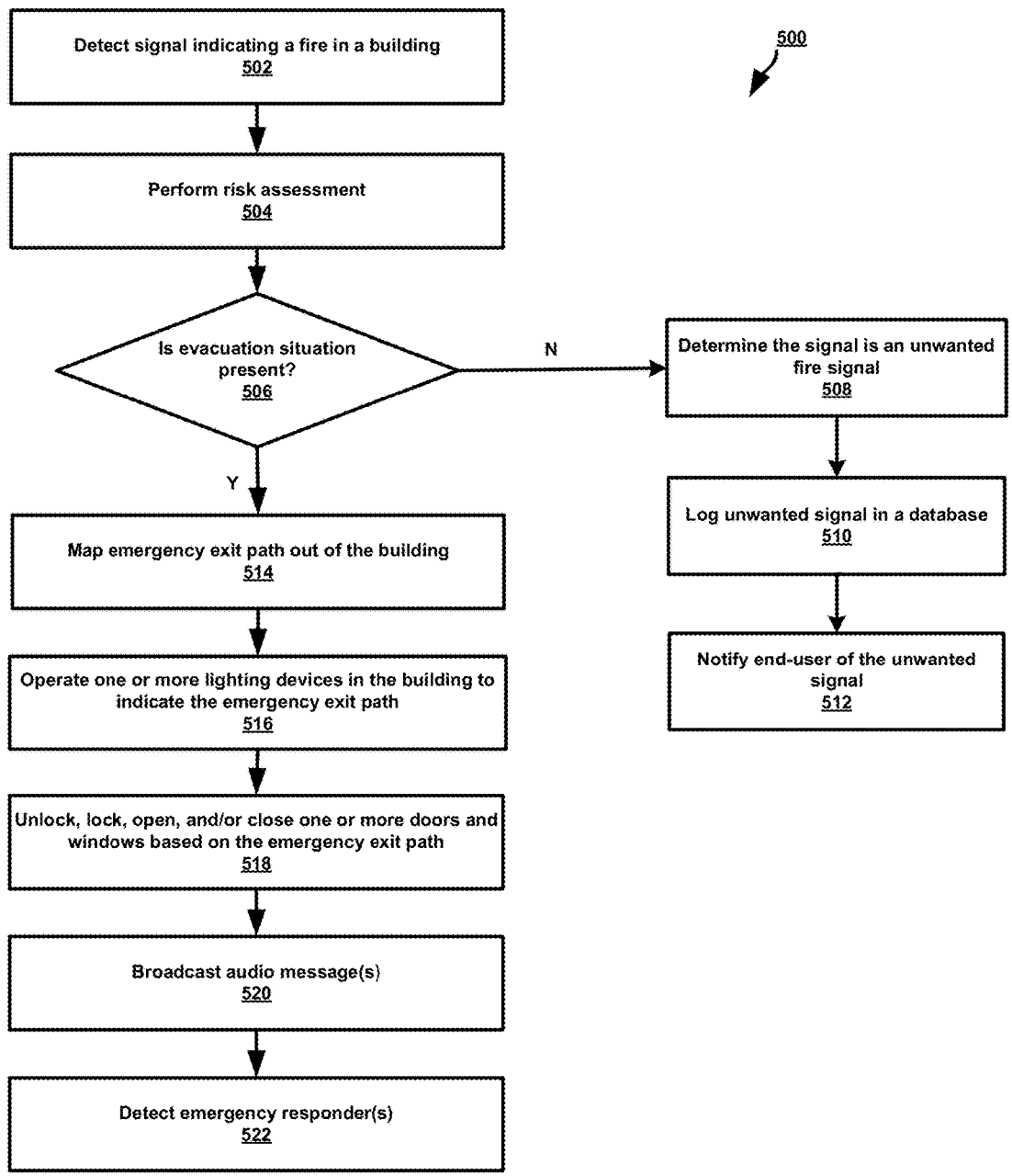
FIG. 5 shows another example method of the system of FIG. 4, according to various embodiments of the present disclosure.

Referring now to FIG. 5, an example method 500 of the home automation system 400 of FIG. 4 is provided. In particular, the PTR 210 having the fire alarm module 220 in an in-home implementation or scenario may be configured to implement one or more steps of the method shown herein. It is noted that the fire alarm module 220 may be installed on the PTR 210 by downloading the module 220 from a communication network, pushing the module 220 onto the PTR 210, and/or provided by dedicated hardware and/or software in the PTR 210. In one aspect, the fire alarm module 220 may be pushed from a satellite communication to the PTR 210 in response to a purchase and/or user-request for the fire alarm module 220. Further, it is noted that the method 500 may include any additional steps not immediately shown or discussed, and that any step may be optional and/or provided in any order. Further, it is noted that the method may be provided on any other centralized devices having the fire alarm module 220 and in communication with the home automation system.

At step 502, the PTR 210 may detect a signal indicating a fire in the building. It is contemplated that the signal may be a sensed input detected at one or more sensors in communication with, or provided at, the PTR 210, such as the smoke/$CO_2$ detector 404. For instance, the signal may be based on a sensed input at a detector located remotely or in another room separate from the PTR 210. Merely by way of example, the detector may comprise a smoke detector and/or a heat detector. In other examples, the signal may comprise a user-input received via a communication network or protocol at the PTR 210. For instance, an occupant at the home may notice an emergency or fire situation and activate the fire alarm module 220 via a mobile device and/or a GUI provided by the PTR 210 on a display device. Other examples are possible.

At step 504, the PTR 210 may perform a risk assessment in response to detecting the signal indicating the fire. The risk assessment may be performed for purposes of distinguishing between a valid fire signal and a false or unwanted fire signal. It is contemplated that false fire signals may arise from, and merely by way of example, sensitive or malfunctioning sensors and/or sensed smoke, heat, and other inputs not attributed to an emergency fire situation. In some aspects, the risk assessment may comprise collecting, by the PTR 210, one or more conditions of the fire in the building structure, assessing, by PTR 210, a risk level based on the one or more collected conditions, and determining, by the PTR 210, whether the signal is a valid fire signal and/or a false fire signal. Further, the risk assessment may include determining, by PTR 210, whether an evacuation situation is present based on the assessed risk level. In other aspects, the risk assessment may be completed by a separate module within the PTR 210 or in communication with the PTR 210, and subsequently communicated with the fire alarm module 220 of the PTR 210.

For example, the one or more conditions detected and/or gathered by the PTR 210 may include any one or variety of an identified location of the fire in the home, an identified location of an occupant or person in the building structure, an identified size of the fire in the building structure, an identified trait of the person in the building structure, and/or a status of a fire protection device in the building structure. For example, the PTR 210 may identify or otherwise retrieve the identified location of the fire by detecting which fire detector sensed the fire and the location of that sensor, and/or analyzing a video or image feed from a live camera, and/or comparing a plurality of sensed input received at a plurality of sensors to determine the location of the fire. In some aspects, the identified location of the fire includes GPS coordinates, the home address, and/or a specific room or floor level of the home. In another aspect, any identified conditions may be sent from the PTR 210 to one or more emergency responders upon detection of the fire or based on the assessed risk level by the PTR 210. In another aspect, results from the risk assessment, such as the assessed risk level, may be sent to the emergency responders or other third parties, including live video, live audio, live data, sensed input detection, live communications with one or more occupants and/or from one or more mobile devices associated with the occupants, and so on. Other embodiments are possible.

In another aspect, the identified size of the fire may include an image or video monitoring and analysis by the PTR 210 to determine a spread of the fire. In another example, a heat sensor may detect a changing temperature, and/or a carbon dioxide or monoxide sensor may detect changing gases. In further examples, the identified size of the fire may be determined based on at least one sensed input detected by an optical sensor, an infrared sensor, a temperature sensor, and an odor detector. Such sensed data may be requested, retrieved, and/or detected, by the PTR 210 and analyzed in the risk assessment, and/or further sent to emergency responders.

In a further aspect, an identified location of the occupant or person comprises an identified room and/or floor level of the house, and/or a GPS location of the person. The identified location of the person may be based on camera and facial recognition analysis of images, voice analysis, such as detecting a sound input in the room and identifying the sound input is associated with the person. In another aspect, the GPS location of the person may be determined based on a location of a mobile device associated with the person. It is contemplated that the PTR 210 may identify a plurality of locations of a plurality of persons in a variety of different manners. In still a further aspect, an identified trait of the person may include, but not be limited to, a name, an age range, a weight, a height, a handicap status, and/or a responsiveness status of the person. Such traits may be identified via user-input, for instance, prompting the person to provide such information and/or analysis of images or speech by the PTR 210. For instance, the PTR 210 may estimate the age range, the weight, and the height of the person based on collected images. Further, the PTR 210 may determine the responsiveness status of the person based on motion sensors and/or audio sensors, e.g. the health sensor 422, to detect a level of activity or the person. In another aspect, the PTR 210 may identify the handicap status by utilizing motion and/or optical sensors to determine if the person is immobile, handicapped, injured, and the like. It is noted that a variety of sensors may be utilized in various implementations described herein.

In yet another aspect, the status of the fire protection device may be determined by the PTR 210. Merely by way of example, the fire protection device may comprise a fire extinguisher and/or a sprinkler system. The status may comprise a presence or an absence of the device within a vicinity of the fire, whether the device is accessible to any persons within the house based on the identified locations of the persons, and/or whether the device is capable of mitigating the detected fire based at least in part on the identified size, and other metrics, of the fire. The status may further provide an active or inactive status of the fire protection device. For instance, the PTR 210 may determine whether the device is expired, inoperative, or operable. In some cases, the PTR 210 may notify one or more persons, via audio alerts and/or text alerts, to retrieve the particular fire protection device for use on a fire detected in a particular room. In that case, an evacuation situation may not immediately be determined as necessary by the PTR 210. In another aspect, the PTR 210 may determine whether a sprinkler system has activated at the identified location of the fire, and if not, then instruct activation of the sprinkler system. The PTR 210 may continue monitoring any conditions related to the fire after implementing the risk assessment(s), for instance, to determine any changes in the situation and/or relay such conditions to emergency responders. Other examples are possible.

Referring again to FIG. 5, at step 506, the PTR 210 may determine if the evacuation situation is present based at least in part on the risk assessment. It is noted that any determination may be overridden by user-input into the PTR 210 or other devices in communication with the PTR 210. If an evacuation situation is determined as not necessary, then the PTR 210 may determine, at step 508, that the signal is an unwanted fire signal. At step 510, the PTR 210 may log the unwanted signal in a database, including a time and date stamp, location or room associated with the signal, captured image or video of the location, and/or sensor(s) statistics from one or more sensor(s) in relation to the signal. At step 512, the PTR 210 may notify an end-user or occupant(s) of the occurrence of the unwanted signal and/or various details logged in the database.

However, in other aspects, the PTR 210 may determine that the evacuation situation is present. In that case, the PTR 210 may map, at step 514, an emergency exit path out of the house. The emergency exit path may be determined based on the identified location of the fire and/or the identified location(s) of the person(s). In some embodiments, a unique emergency exit path is determined for each person in the home. In other embodiments, the emergency exit path is further determined based on a layout or floorplan of the home, which may be previously provided and/or stored by the fire alarm module 220. It is contemplated that the emergency exit path is mapped based on the locations of interior and exterior doors, windows, and other entries and exits of the house. The emergency exit path may comprise a shortest, quickest, and/or easiest route of the house that avoids the detected fire and/or other dangers.

At step 516, the PTR 210 may operate one or more lighting devices in the house to indicate the emergency exit path. Merely by way of example, the PTR 210 may signal the light controller 434 and/or the lighting devices in rooms not within the emergency exit path and/or unoccupied to be turned off, dimmed, or changed to a different color, e.g. red. In another aspect, the PTR 210 may signal the light controller 434 and/or the lighting devices in rooms within the emergency exit path or occupied to be turned on, adjusted in brightness, and/or emit a particular color, e.g. green. Still, in further aspects, the PTR 210 may intermittently power on and off one or more of the plurality of lighting devices. In this case, the PTR 210 may provide various patterns of flashing and blinking lights at various timed intervals along the emergency exit path. In another aspect, the PTR 210 may implement flashing lights in an occupied room corresponding to the identified location of the occupant(s). In that case, the flashing lights may inform the occupants, such as deaf occupants, of the emergency situation, and/or inform emergency responders that there are occupants in that room. In a different example, the PTR 210 may intermittently dim on and off one or more of the plurality of lighting devices. In still another example, the PTR 210 may control an emitted color or color changes of the one or more plurality of lighting devices. For instance, the PTR 210 may signal an LED light of a ceiling track light to emit a red color to further inform the occupant(s) of the emergency situation. Other embodiments are possible.

At step 518, the PTR 210 may operate one or more locks, and/or one or more lock controllers 444, on one or more doors and/or windows based on the risk assessment, the emergency exit path, and/or other sensed conditions. Merely by way of example, the PTR 210 may signal the lock controller 444 to unlock a door within the determined emergency exit path. Furthermore, the PTR 210 may signal for automatically opening and maintaining opening of the in-path door. The PTR 210 may also lock and/or close a door determined to be out of the emergency exit path, and/or associated with an unoccupied room or room where a heat sensor indicates an increasing temperature. For instance, the PTR 210 may close and lock the out-of-path door associated with the identified location of the fire to contain the fire and prevent fumes from spreading to other rooms. Similarly, the PTR 210 may unlock and/or open one or more windows that may provide an emergency escape, as determined in the emergency exit path. In another aspect, the PTR 210 may close and/or lock particular windows. In another aspect, the PTR 210 may unlock and/or open various cabinets and/or doors that may secure the fire protection device and/or a safe containing valuables. In a further aspect, the PTR 210 may detect an open or closed, or locked or unlocked, status of the doors or windows with various door sensors 412 and/or window sensors 410. It is noted that operation of the doors, windows, and locks thereof, may be automatic based on the risk assessment, the emergency exit path, and/or the sensed conditions, and any of the operations may be overridden manually and/or by signal generated by a user-input received at the PTR 210.

At step 520, the PTR 210 may broadcast audio message(s) via speakers, for instance by turning on one or more speakers provided by the PTR 210 and/or display device, e.g. the displace device 430, connected thereto, and/or to the intercom 426. The PTR 210 may automatically set a volume for the broadcast audio message. It is contemplated that the audio message(s) may contain instructions for following the emergency exit path out of the home, a designated meeting location for occupants, and/or relay a live two-way audio communication with remotely-located emergency responder system(s). For instance, the PTR 210 may initiate the live, two-way audio communication with the emergency responder system based on the risk assessment and provide two-way communication through the intercom system of the home. Other embodiments are possible.

At step 522, the PTR 210 may detect arrival or proximity of one or more emergency responder(s) at the house, a front entry of the house, and/or a designated exit of the determined emergency exit path. For instance, the PTR 210 may detect, via the communication device 424 or other wireless sensors, a fire truck arriving or approaching the house within a predetermined vicinity of the house. In some aspects, the predetermined vicinity may be user-selectable and/or between about 50 to 100 feet radius from a center point located at the house. In some cases, the PTR 210 may automatically unlock doors and/or windows of the house upon detection of the arrival of the emergency responders. In another aspect, the PTR 210 may be configured to grant access to an entryway of the house based on a scanned or otherwise detected smart card. In a particular aspect, at least two smart cards may be required to unlock and/or open a door of the house to deter inappropriate usage of the smart cards. Other embodiments are possible.

In another example, it is contemplated that the PTR 210 may determine that the fire signal resulted from an attempted burglary and/or trespassing of the house. For instance, one or more security cameras 408 may indicate a break-in attempt in combination with the emergency fire. In that case, the PTR 210 may notify local authorities and provide the emergency exit path based at least in part on the determined location of the fire and a determined location of a trespasser. Merely by way of example, the PTR 210 may attempt to lock in the trespasser in a room until authorities arrive at the site. It is noted that various embodiments are possible.

In further aspects, the fire alarm module 220 may detect for new lighting devices incorporated in the home automation system or integration system at the house. In that case, the fire alarm module 220 may instruct the PTR 210 to incorporate the new lighting devices into the risk assessment, mapping, and other methods described herein. Further, it is noted that the systems and methods described herein may be implemented in any type of building structure, including residential, schools, malls, and commercial buildings.

Figure 6:
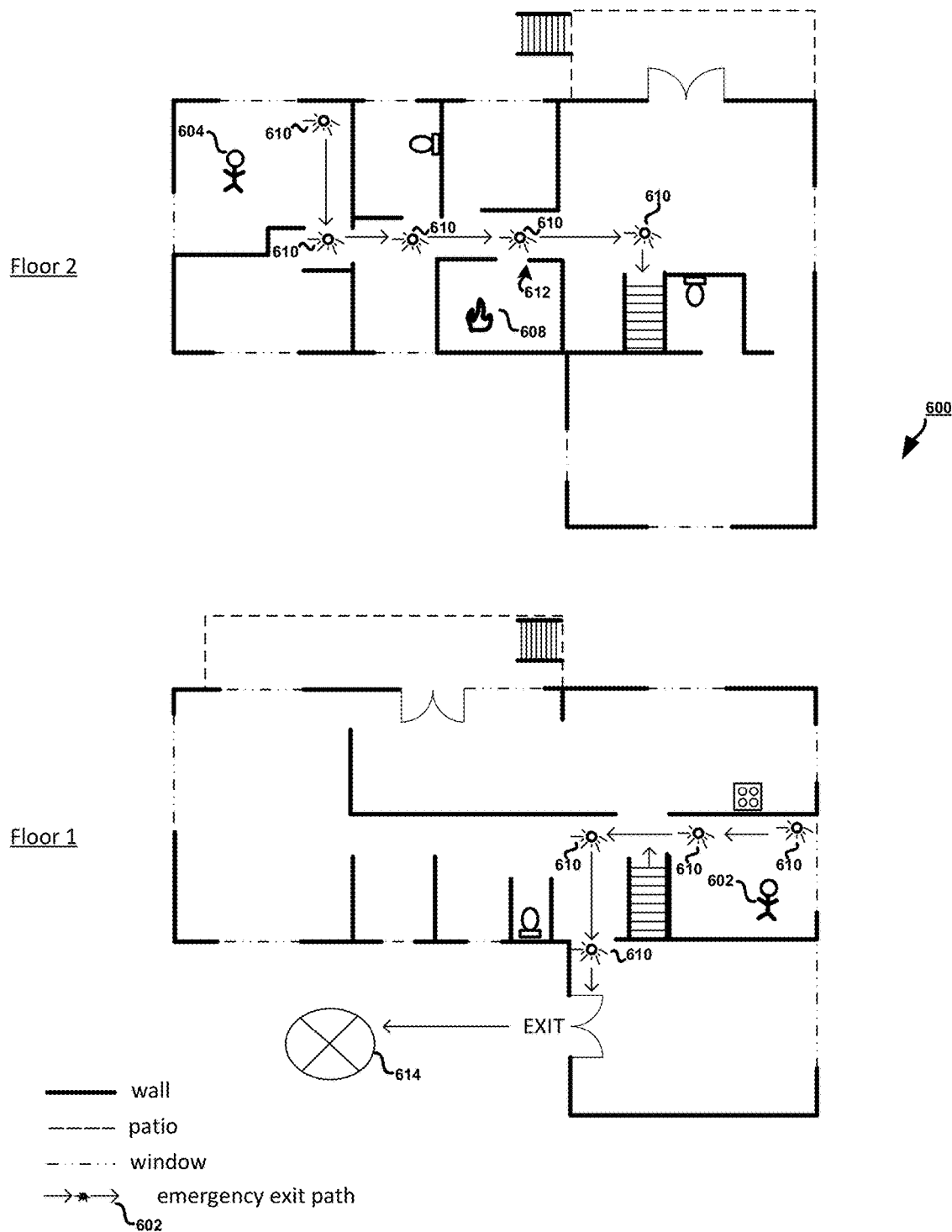
FIG. 6 shows an example emergency exit path, according to various embodiments of the present disclosure.

Turning now to FIG. 6, an example mapping 600 determined by the PTR 210 and overlain on a floor plan of the house is shown. The mapping 600 includes a determined emergency exit path 602 based on the identified locations of the persons 604,606 and the identified location of a fire 608 within the house. As shown, a plurality of lighting devices 610 along the determined emergency exit path 602 are lit or otherwise operated by the PTR 210 to indicate the emergency exit path 602. Further, it is contemplated that a doorway 612 between the emergency exit path 602 and a room containing the fire 608 is locked or otherwise shut to deter entry into the room and/or spread of the fire. A designated meeting location 614 may further be provided by the mapping 600 as a place of gathering for the persons 604,606 in the emergency situation. It is contemplated that the designated meeting location 614 may be predetermined by a user, and/or may be one of a plurality of predetermined meeting locations stored by the PTR 210, which may select a single meeting location based upon safety and other conditions associated with the emergency. Even further, it is noted that one or more default emergency exit paths may be pre-entered and stored by the PTR 210. The default emergency exit paths may be user-preferred based on user selection and/or a pre-calculated mapping by the PTR 210. Still further, it is noted that any of the mapping 600 and/or information of locations, such as last-seen locations, as detected by sensor(s) in operative communication with the PTR 210, may be relayed to one or more emergency responder system(s) to aid in rescue and recovery missions.

It is contemplated that the systems and methods disclosed herein may be utilized with a variety of detectors, including smoke detectors and carbon monoxide detectors. For instance, evacuation in an event of carbon monoxide buildup may be facilitated with the present systems and methods. Advantageously, any lethal gas that may be odorless and/or colorless may be effectively invisible to occupants and therefore difficult for them to detect and avoid. The present systems and methods may provide a safe evacuation route that avoids areas of carbon monoxide buildup by detecting such buildup with sensors and mapping the evacuation route to avoid rooms exhibiting high levels of the lethal gas. Further, upon detection of the carbon monoxide, the systems and methods disclosed herein may automatically operate other devices in the home automation system accordingly. For instance, the systems and methods disclosed herein may automatically open one or more windows, turn on an extractor fan, turn off a gas appliance if the appliance is in a room with the dangerous levels of carbon monoxide detected therein, deny entrance to an unsafe room by locking and/or closing a door to that room assuming it is unoccupied, and so on. In a different aspect, the systems and methods disclosed herein may further provide evacuation routes in the event of danger that is sensed. For instance, a break-in situation may be sensed by a camera, microphone, or other sensor and/or processor. Merely by way of example, if a window or door is detected as broken in to, the systems and methods disclosed herein may indicate a safe evacuation route out of the house or to a secure room, while notifying authorities with video, text, phone call, and so on. In that case, the evacuation route may be provided to a mobile device associated with the one or more occupants. Other examples and benefits are possible.

Figure 7:
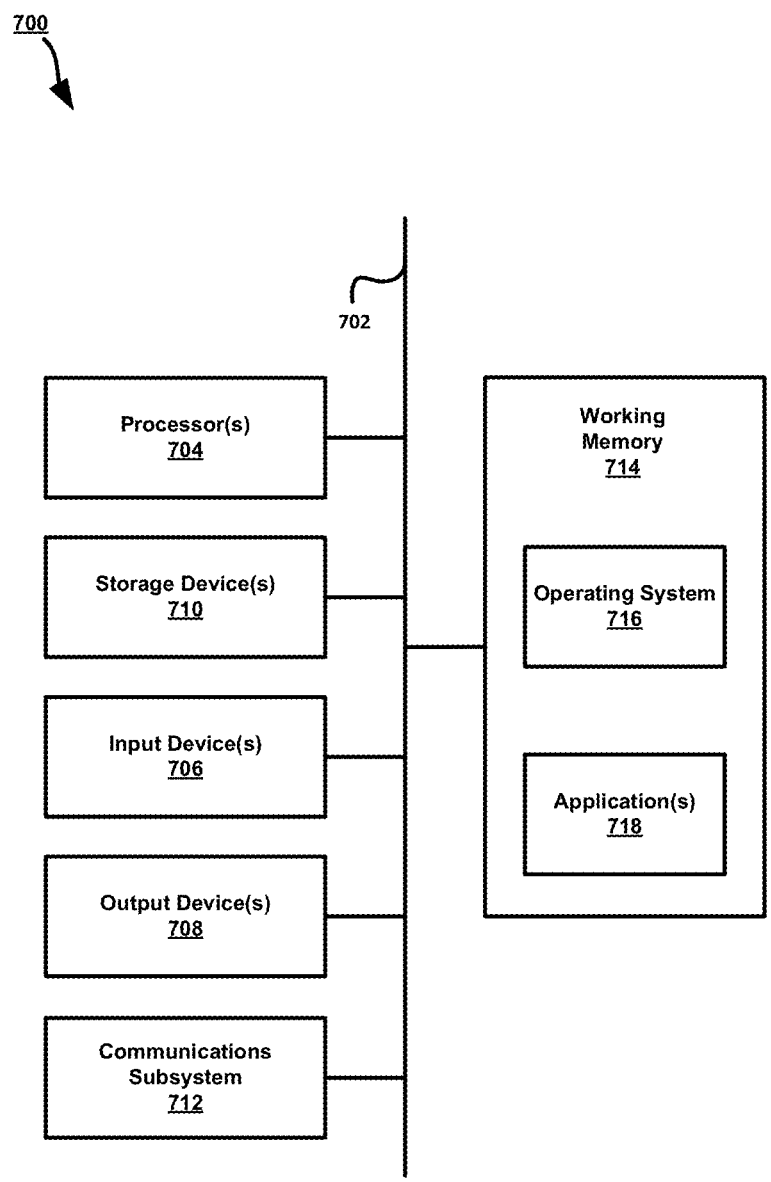
FIG. 7 shows a computer system upon which various aspects of the present disclosure may be implemented.

FIG. 7 shows an example computer system or device 700 in accordance with the disclosure. An example of a computer system or device includes a particular "smart" home automation-related sensor or device or system or controller or monitor or detector or the like, an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIG. 2 and FIG. 4. In this manner, any of one or more of the respective elements of at least FIG. 2 and FIG. 4 may be configured and/or arranged, wholly or at least partially, for enabling mapping and facilitating evacuation routes in emergency situations provided for by a television receiver, in manner consistent with that discussed above in connection with FIGS. 1-6. For example, any of one or more of the respective elements of at least FIG. 2 and/or FIG. 4 may be configured and/or arranged to perform and/or include instructions that, when executed, implement wholly or at least partially the method of FIG. 1. Still further, any of one or more of the respective elements of at least FIG. 2 may be configured to perform and/or include instructions that, when executed, instantiate and implement functionality of the fire alarm module 220.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many examples, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 700) to perform methods in accordance with various examples of the disclosure. According to a set of examples, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704. It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for indicating an emergency exit path upon detection of a fire in a building structure, comprising:
    detecting, by a television receiver, a signal indicating presence of the fire in the building structure;
    upon detecting the signal indicating the presence of the fire, determining, by the television receiver, an evacuation situation is present based on a risk assessment, wherein the risk assessment comprises:
        collecting, by the television receiver, one or more conditions of the fire in the building structure, wherein the one or more conditions comprises at least one or more of:
            an identified location of the fire in the building structure, an identified location of a person in the building structure, an identified size of the fire in the building structure, an identified trait of the person in the building structure, and a status of a fire protection device in the building structure, wherein the status comprises at least one of a presence, absence, active, and inactive status of the fire protection device;
        assessing a risk level based on the one or more conditions; and
        determining the evacuation situation is present based on the assessed risk level;
    in response to determining the evacuation situation is present, mapping, by the television receiver, the emergency exit path out of the building structure based on an identified location of the fire and the identified location of the person in the building structure; and
    operating, by the television receiver, a plurality of lighting devices in the building structure to indicate the emergency exit path out of the building structure.

2. The method for indicating the emergency exit path upon detection of the fire in the building structure of claim 1, further comprising:
    unlocking, by the television receiver, at least one door lock of an in-path door in the building structure to indicate the emergency exit path out of the building structure, wherein the in-path door is located within the emergency exit path.

3. The method for indicating the emergency exit path upon detection of the fire in the building structure of claim 2, further comprising:
    signaling, by the television receiver, a door opening module corresponding to the in-path door in the building structure to open and maintain and open position of the in-path door.

4. The method for indicating the emergency exit path upon detection of the fire in the building structure of claim 1, further comprising:
    locking, by the television receiver, at least one door lock of an out-of-path door in the building structure to indicate the emergency exit path out of the building structure, wherein the out-of-path door lock is located outside of the emergency exit path.

5. The method for indicating the emergency exit path upon detection of the fire in the building structure of claim 1, further comprising:
    unlocking, by the television receiver, at least one window lock of a window in the building structure to indicate the emergency exit path out of the building structure.

6. The method for indicating the emergency exit path upon detection of the fire in the building structure of claim 1, further comprising:
    mapping, by the television receiver, a plurality of emergency exit paths out of the building structure based on the identified location of the fire and a plurality of identified locations of a plurality of persons; and
    operating, by the television receiver, the plurality of lighting devices in the building structure to indicate the plurality of emergency exit paths out of the building structure.

7. The method for indicating the emergency exit path upon detection of the fire in the building structure of claim 1, further comprising:
    wherein the fire protection device comprises at least one of a fire extinguisher and a sprinkler system.

8. The method for indicating the emergency exit path upon detection of the fire in the building structure of claim 1, further comprising:
    wherein the fire protection device is located at the identified location of the fire in the building structure.

9. The method for indicating the emergency exit path upon detection of the fire in the building structure of claim 1, further comprising:
    wherein each of the identified location of the fire and the identified location of the person comprises an identified room of the building structure.

10. The method for indicating the emergency exit path upon detection of the fire in the building structure of claim 1, further comprising:
    wherein the identified trait of the person comprises at least one of a name, an age range, a weight, a height, a handicap status, and a responsiveness status.

11. The method for indicating the emergency exit path upon detection of the fire in the building structure of claim 1, further comprising:
    wherein the identified size of the fire in the building structure is based on at least one sensed input detected by at least one sensor, wherein the at least one sensor comprises an optical sensor, an infrared sensor, a heat sensor, a temperature sensor, and an odor detector.

12. The method for indicating the emergency exit path upon detection of the fire in the building structure of claim 1, further comprising:
    wherein the signal indicating presence of the fire in the building structure is based on a sensed input at a detector comprising at least one of a smoke detector and a heat detector.

13. The method for indicating the emergency exit path upon detection of the fire in the building structure of claim 12, further comprising:
    wherein operating the plurality of lighting devices further comprises at least one of:

intermittently powering on and off one or more of the plurality of lighting devices;
intermitting dimming on and off one or more of the plurality of lighting devices; and
controlling color changes of the one or more plurality of lighting devices.

14. The method for indicating the emergency exit path upon detection of the fire in the building structure of claim 1, further comprising:
in response to detecting the signal indicating the presence of the fire, outputting, by the television receiver, an audio broadcast over one or more audio speakers in communication with the television receiver.

15. The method for indicating the emergency exit path upon detection of the fire in the building structure of claim 1, further comprising:
detecting, by the television receiver, one or more emergency responders in a proximity of the building structure; and
in response to detecting the one or more emergency responders, unlocking, by the television receiver, at least one door lock of the building structure.

16. A television receiver for indicating an emergency exit path upon detection of a fire in a building structure, comprising:
one or more tuners;
one or more processors; and
a memory communicatively coupled with and readable by the one or more processors and having stored therein processor-readable instructions that, when executed by the one or more processors, cause the one or more processors to:
receive television channels via the one or more tuners;
detect a signal indicating presence of the fire in the building structure;
upon detecting the signal indicating the presence of the fire, determine an evacuation situation is present based on a risk assessment, wherein the risk assessment comprises causing the one or more processors to:
collect one or more conditions of the fire in the building structure, wherein the one or more conditions comprises at least one or more of:
an identified location of the fire in the building structure, an identified location of a person in the building structure, an identified size of the fire in the building structure, an identified trait of the person in the building structure, and a status of a fire protection device in the building structure, wherein the status comprises at least one of a presence, absence, active, and inactive status of the fire protection device;
assess a risk level based on the one or more conditions; and
determine the evacuation situation is present based on the assessed risk level;
in response to determining the evacuation situation is present, map the emergency exit path out of the building structure based on the identified location of the fire and the identified location of the person in the building structure; and
operate a plurality of lighting devices in the building structure to indicate the emergency exit path out of the building structure.

17. A non-transitory computer readable medium having stored thereon sets of instructions which, when executed by one or more processors of a television receiver, cause the television receiver to:
receive television channels via one or more tuners of the television receiver
detect a signal indicating a presence of a fire in a building structure;
upon detecting the signal indicating the presence of the fire, determine an evacuation situation is present based on a risk assessment, wherein the risk assessment comprises causing the television receiver to:
collect one or more conditions of the fire in the building structure, wherein the one or more conditions comprises at least one or more of:
an identified location of the fire in the building structure, an identified location of a person in the building structure, an identified size of the fire in the building structure, an identified trait of the person in the building structure, and a status of a fire protection device in the building structure, wherein the status comprises at least one of a presence, absence, active, and inactive status of the fire protection device;
assess a risk level based on the one or more conditions; and
determine the evacuation situation is present based on the assessed risk level;
in response to determining the evacuation situation is present, map an emergency exit path out of the building structure based on the identified location of the fire and the identified location of the person in the building structure; and
operate a plurality of lighting devices in the building structure to indicate the emergency exit path out of the building structure.

* * * * *